United States Patent
Sahraei et al.

(10) Patent No.: US 12,550,134 B2
(45) Date of Patent: Feb. 10, 2026

(54) CROSS-MODE SCHEDULING WITH RIS-AWARE TRANSMISSION CONFIGURATION STATE

(71) Applicant: QUALCOMM INCORPORATED, San Diego, CA (US)

(72) Inventors: Saeid Sahraei, San Diego, CA (US); Yu Zhang, San Diego, CA (US); Hung Dinh Ly, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 18/257,553

(22) PCT Filed: Feb. 7, 2021

(86) PCT No.: PCT/CN2021/075713
§ 371 (c)(1),
(2) Date: Jun. 14, 2023

(87) PCT Pub. No.: WO2022/165784
PCT Pub. Date: Aug. 11, 2022

(65) Prior Publication Data
US 2024/0040560 A1 Feb. 1, 2024

(51) Int. Cl.
*H04W 4/00* (2018.01)
*H04W 72/1263* (2023.01)
(Continued)

(52) U.S. Cl.
CPC ..... *H04W 72/1263* (2013.01); *H04W 72/232* (2023.01); *H04W 88/04* (2013.01); *H04W 92/04* (2013.01)

(58) Field of Classification Search
None
See application file for complete search history.

(56) References Cited

U.S. PATENT DOCUMENTS

2019/0394793 A1  12/2019  Venugopal et al.
2020/0107352 A1* 4/2020  Tsai ................. H04B 7/0617
(Continued)

OTHER PUBLICATIONS

International Search Report and Written Opinion—PCT/CN2021/075713—ISAEPO—Jul. 7, 2021.

*Primary Examiner* — Bob A Phunkulh
(74) *Attorney, Agent, or Firm* — Holland & Hart LLP

(57) ABSTRACT

Methods, systems, and devices for wireless communications are described. A user equipment (UE) may receive a configuration including a first group of transmission configuration states associated with transmission via a configurable surface and a second group of transmission configuration states independent of the configurable surface. The UE may receive downlink control information according to a first transmission configuration state of the first group of transmission configuration states. The UE may receive the downlink control information via a transmission path including the configurable surface. The downlink control information may include a grant scheduling a data transmission according to a second transmission configuration state of the second group of transmission configuration states. The UE may perform or receive the data transmission according to the second transmission configuration state. The downlink control information based on a set of resources associated with transmission via the configurable surfaces satisfying a threshold.

30 Claims, 11 Drawing Sheets

(51) Int. Cl.
*H04W 72/232* (2023.01)
*H04W 88/04* (2009.01)
*H04W 92/04* (2009.01)

(56) References Cited

U.S. PATENT DOCUMENTS

| | | | |
|---|---|---|---|
| 2020/0112974 A1 | 4/2020 | Sun et al. | |
| 2020/0314881 A1* | 10/2020 | Bagheri | H04L 5/0051 |
| 2020/0351892 A1* | 11/2020 | Yi | H04L 5/0092 |
| 2021/0105780 A1* | 4/2021 | Jin | H04W 76/27 |
| 2021/0352706 A1* | 11/2021 | Kang | H04L 5/0044 |
| 2022/0052764 A1* | 2/2022 | Medra | H04B 10/614 |
| 2022/0077982 A1* | 3/2022 | Zhang | H04L 5/0053 |
| 2022/0232599 A1* | 7/2022 | Xue | H04W 72/0446 |
| 2023/0045971 A1* | 2/2023 | Kim | H04L 5/0044 |
| 2023/0141329 A1* | 5/2023 | Ling | H04L 5/0051 |
| | | | 455/522 |
| 2023/0276454 A1* | 8/2023 | Zhu | H04L 5/0051 |
| | | | 370/329 |
| 2023/0284149 A1* | 9/2023 | Zhu | H04W 16/28 |
| | | | 370/318 |
| 2024/0306015 A1* | 9/2024 | Matsumura | H04L 5/0053 |
| 2024/0314804 A1* | 9/2024 | Liu | H04L 5/0053 |

* cited by examiner

CROSS-MODE SCHEDULING WITH RIS-AWARE TRANSMISSION CONFIGURATION STATE

CROSS REFERENCE

The present application is a 371 national stage filing of International PCT Application No. PCT/CN2021/075713 by SAHRAEI et al. entitled "CROSS-MODE SCHEDULING WITH RIS-AWARE TRANSMISSION CONFIGURATION STATE," filed Feb. 7, 2021, which is assigned to the assignee hereof, and which is expressly incorporated by reference in its entirety herein.

FIELD OF TECHNOLOGY

The following relates to wireless communications, including cross-mode scheduling with RIS-aware transmission configuration state.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a base station may communicate with a UE using a reconfigurable intelligent surface (RIS).

SUMMARY

The described techniques relate to improved methods, systems, devices, and apparatuses that support cross-mode scheduling with RIS-aware transmission configuration state. Generally, the described techniques provide for a user equipment (UE) to communicate with a base station using reconfigurable intelligent surface (RIS)-assisted communications.

A UE may receive a configuration including a first group of transmission configuration states associated with transmission via a configurable surface (e.g., a RIS) and a second group of transmission configuration states independent of the configurable surface. The UE may receive downlink control information according to a first transmission configuration state of the first group of transmission configuration states. In some aspects, the UE may receive the downlink control information via a transmission path including the configurable surface (e.g., over a RIS-assisted communications link). The downlink control information may include a grant scheduling a data transmission according to a second transmission configuration state of the second group of transmission configuration states.

The UE may perform or receive the data transmission according to the second transmission configuration state. The data transmission may be an uplink data transmission or a downlink data transmission. In some examples, the UE may perform or receive the data transmission according to the second transmission configuration state, via a transmission path independent of the configurable surface (e.g., over a non RIS-assisted communications link). In some aspects, the UE may receive the downlink control information based on a set of resources associated with transmission via the configurable surfaces being less than a threshold.

A method for wireless communication at a UE is described. The method may include receiving a configuration including a set of transmission configuration states, the set of transmission configuration states including a first group of transmission configuration states associated with transmission via one or more configurable surfaces and a second group of transmission configuration states independent of the one or more configurable surfaces, receiving downlink control information according to a first transmission configuration state of the first group of transmission configuration states, the downlink control information including a grant scheduling a data transmission according to a second transmission configuration state of the second group of transmission configuration states, and performing or receiving the data transmission according to the second transmission configuration state.

An apparatus for wireless communication at a UE is described. The apparatus may include a processor, memory coupled with the processor, and instructions stored in the memory. The instructions may be executable by the processor to cause the apparatus to receive a configuration including a set of transmission configuration states, the set of transmission configuration states including a first group of transmission configuration states associated with transmission via one or more configurable surfaces and a second group of transmission configuration states independent of the one or more configurable surfaces, receive downlink control information according to a first transmission configuration state of the first group of transmission configuration states, the downlink control information including a grant scheduling a data transmission according to a second transmission configuration state of the second group of transmission configuration states, and perform or receive the data transmission according to the second transmission configuration state.

Another apparatus for wireless communication at a UE is described. The apparatus may include means for receiving a configuration including a set of transmission configuration states, the set of transmission configuration states including a first group of transmission configuration states associated with transmission via one or more configurable surfaces and a second group of transmission configuration states independent of the one or more configurable surfaces, means for receiving downlink control information according to a first transmission configuration state of the first group of transmission configuration states, the downlink control information including a grant scheduling a data transmission according to a second transmission configuration state of the second group of transmission configuration states, and means for performing or receiving the data transmission according to the second transmission configuration state.

A non-transitory computer-readable medium storing code for wireless communication at a UE is described. The code may include instructions executable by a processor to receive a configuration including a set of transmission configuration states, the set of transmission configuration states including a first group of transmission configuration states associated with transmission via one or more configurable surfaces and a second group of transmission configuration states independent of the one or more configurable surfaces, receive downlink control information according to a first transmission configuration state of the first group of transmission configuration states, the downlink control information including a grant scheduling a data transmission according to a second transmission configuration state of the second group of transmission configuration states, and perform or receive the data transmission according to the second transmission configuration state.

In some examples of the method, apparatuses, and non-transitory computer-readable medium described herein, the downlink control information may be received based on a set of resources associated with transmission via the one or more configurable surfaces satisfies a threshold, the set of resources including set of time resources, a set of frequency resources, or both.

Some examples of the method, apparatuses, and non-transitory computer-readable medium described herein may further include operations, features, means, or instructions for receiving the downlink control information may be via a transmission path including the one or more configurable surfaces.

Some examples of the method, apparatuses, and non-transitory computer-readable medium described herein may further include operations, features, means, or instructions for receiving signaling including the configuration, the signaling further including a grant scheduling a second data transmission according to a third transmission configuration state of the second group of transmission configuration states, the method further including and performing or receiving the second data transmission according to the third transmission configuration state, where performing or receiving the second data transmission may be via a transmission path independent of the one or more configurable surfaces.

In some examples of the method, apparatuses, and non-transitory computer-readable medium described herein, the grant scheduling the second data transmission indicates a set of time resources, a set of frequency resources, or both included in a control resource set of a bandwidth part indicated by the signaling.

In some examples of the method, apparatuses, and non-transitory computer-readable medium described herein, the signaling includes a radio resource control configuration message.

Some examples of the method, apparatuses, and non-transitory computer-readable medium described herein may further include operations, features, means, or instructions for receiving second downlink control information according to a fourth transmission configuration state of the second group of transmission configuration states, the second downlink control information including a grant scheduling a second data transmission according to a fifth transmission configuration state of the first group of transmission configuration states and performing or receiving the data transmission according to the fifth transmission configuration state, where performing or receiving the second data transmission may be via a transmission path including the one or more configurable surfaces.

In some examples of the method, apparatuses, and non-transitory computer-readable medium described herein, the downlink control information activates one or more transmission configuration states of the set of transmission configuration states.

Some examples of the method, apparatuses, and non-transitory computer-readable medium described herein may further include operations, features, means, or instructions for performing or receiving the data transmission according to the second transmission configuration state may be via a transmission path independent of the one or more configurable surfaces.

In some examples of the method, apparatuses, and non-transitory computer-readable medium described herein, the downlink control information includes respective identifiers associated the one or more configurable surfaces.

In some examples of the method, apparatuses, and non-transitory computer-readable medium described herein, the data transmission includes an uplink data transmission or a downlink data transmission.

DETAILED DESCRIPTION

Figure 1:
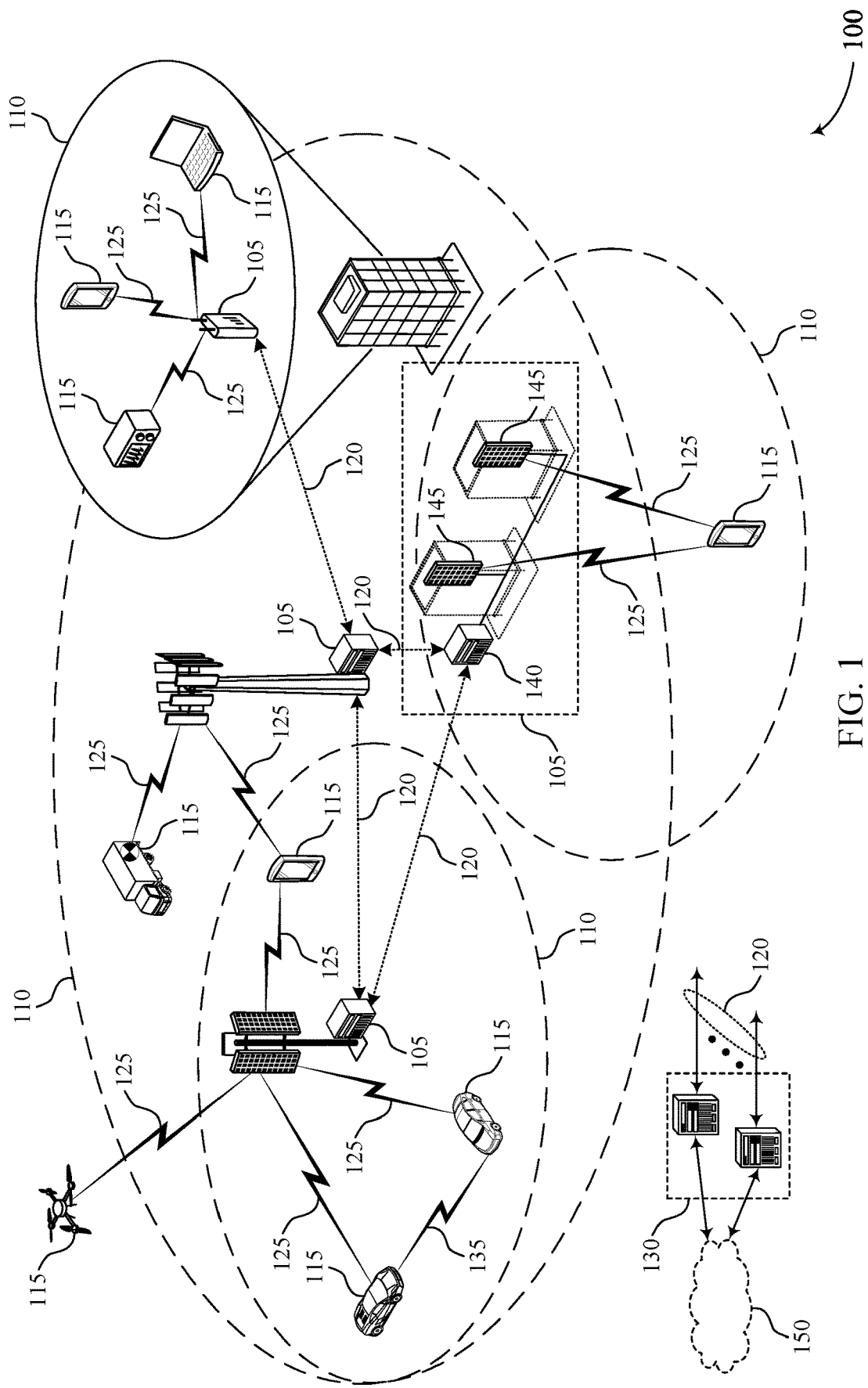
FIG. 1 illustrates an example of a wireless communications system that supports cross-mode scheduling with RIS-aware transmission configuration state in accordance with aspects of the present disclosure.

In some wireless communications systems (e.g., systems implementing a massive multiple input-multiple output (MIMO) communication scheme), wireless devices may implement spatial division multiple access (SDMA) to increase signaling throughput. For example, a base station may use beamforming techniques to communicate with multiple user equipment (UEs) concurrently by using spatial dimensions provided by an environment. However, in some cases, physical proximity or environmental factors (e.g., interference, blockage) may impair beamforming communications between the base station and the multiple UEs. In some cases, to overcome such impairments, the base station may employ an active antenna unit (AAU) to act as a relay between the base station and the multiple UEs. The AAU may include one or more antenna ports, radio frequency (RF) chains, and power amplifiers. The AAU may allow the base station to increase spatial diversity, beamforming gain, and cell coverage. For example, the AAU may receive a beamformed communication from the base station, amplify the beamformed communication, and re-transmit the beamformed communication to a UE.

As such, in comparison to receiving the beamformed communication directly from the base station, the UE may have a higher likelihood of successfully receiving the beamformed communication via the AAU. However, active components (e.g., RF chains, power amplifiers) used by the AAU to amplify signals may be associated with increased power consumption. For example, a power amplifier at the AAU may utilize a significant power overhead to amplify and re-transmit a received signal. Such power overhead may be undesirable and inefficient in some systems.

In some examples, the base station may employ a reconfigurable intelligent surface (RIS) that uses passive or nearly passive components to redirect (e.g., reflect, refract) incoming signals in one or more directions without utilizing a significant power overhead. For example, the RIS may use configurable materials to redirect a signal in a specific direction (e.g., instead of using a power amplifier to amplify and re-transmit the signal). As such, the RIS may increase cell coverage, spatial diversity, and beamforming gain while consuming less power than an AAU. In some aspects, the base station may dynamically configure the RIS to redirect an incoming signal in a specific direction. For example, the base station may configure the RIS to redirect a beamformed communication in a direction of a UE based on a location of the UE. Similarly, the UE may transmit a beamformed communication in a direction of the RIS for redirection to the base station based on a base station configuration or a UE selection.

To effectively implement the RIS, the base station may indicate configuration information for the RIS to the UE. The configuration information may include a location of the RIS, a redirection angle of the RIS, or both. In some examples, the base station may transmit, to the UE (e.g., via a RIS), configuration information for multiple RISs in a coverage area of the base station. The UE may select one of the multiple RISs to facilitate communication with the base station based on the configuration information for the multiple RISs. In some aspects, the UE may transmit, to the base station, feedback indicating the selected RIS.

The base station may communicate with multiple UEs via one or more RISs distributed throughout a coverage area. In some examples, the base station may use multiple RISs to communicate with a single UE. For example, if a path between a UE and the base station using a RIS is obstructed, experiences interference, or otherwise drops below a quality or signal strength threshold, the base station may use another RIS (or RISs) to communicate with the UE via a different path. As such, communication using one or more RISs may provide increased spatial diversity, cell coverage, and throughput, among other benefits.

A UE may support receiving downlink communications directly from a base station, for example, over a communications link that is independent of RIS-assisted communications. The communications link independent of RIS-assisted communications may also be referred to herein as a direct communications link, a non RIS-based communications link, or a non RIS-assisted communications link. In some cases, the UE may support receiving downlink communications indirectly from the base station, for example, over a communications link that is associated with RIS-assisted communications. The communications link associated with RIS-assisted communications may also be referred to herein as an indirect communications link, a RIS-based communications link, or a RIS-assisted communications link).

In an example, the UE may receive (e.g., as part of an initial access procedure between the UE and the base station) a configuration from a base station for one or more transmission configuration states (e.g., transmission configuration indicator (TCI) states) for receiving transmissions via one or more RISs. For example, the base station may configure the UE according to a first transmission configuration state supportive of indirect communication of downlink channel transmissions (e.g., physical downlink control channel (PDCCH), physical downlink shared channel (PDSCH)) and downlink reference signals (e.g., CSI-RSs) from the base station, over a RIS-based communications link. In another example, the base station may configure the UE according to a second transmission configuration state supportive of direct communication of downlink channel transmissions (e.g., PDCCH, PDSCH) and downlink reference signals (e.g., CSI-RSs) from the base station, independent of the one or more RISs, over a non RIS-based communications link. In some aspects, based on a transmission configuration state indicated in the initial access procedure, the UE may identify whether communications between the base station and the UE are to be RIS-based or non RIS-based.

However, in some systems, the UE may be unable to determine whether the transmission configuration state is properly configured for directly (e.g., over a non RIS-based communications link, non RIS-assisted) or indirectly (e.g., over a RIS-based communications link, RIS-assisted) receiving downlink channel transmissions from the base station. For example, the base station may configure the UE for indirect communication with the base station (e.g., over an RIS-based communications link) according to the first transmission configuration state, and the UE may expect to receive downlink channel transmissions indirectly from the base station. However, in an example in which the UE is configured by the base station for indirect communication (e.g., over a RIS-based communications link) according to the first transmission configuration state, but the base station instead directly (e.g., over a non RIS-based communications link) transmits a downlink channel transmission to the UE, the UE may be unable to successfully receive the downlink channel transmission. Accordingly, the UE may initiate beam failure detection procedures (e.g., recovery) or radio link failure procedures, leading to high power consumption at the UE and communication disruptions.

In another example, the base station may configure the UE for direct communication with the base station (e.g., over a non RIS-based communications link) according to the second transmission configuration state, and the UE may expect to receive downlink channel transmissions directly from the base station. However, in an example in which the UE is configured by the base station for direct communication (e.g., over a non RIS-based communications link) according to the second transmission configuration state, but the base station instead indirectly (e.g., over an RIS-based communications link) transmits a downlink channel transmission to the UE, the UE may be unable to successfully receive the downlink channel transmission. Accordingly, the UE may initiate beam failure detection procedures (e.g., recovery) or radio link failure procedures, leading to high power consumption at the UE and communication disruptions.

In some other cases, the first transmission configuration state may indicate a quasi-co-location source associated with indirect (e.g., over an RIS-based communications link) transmissions from the base station. In an example, the quasi-co-location source may be a synchronization signal block associated with a broadcast channel (e.g., a SS/PBCH block) or a channel state information (CSI)-reference signal (RS) (CSI-RS), which the UE may use for interference measurement and interference management. In an example in which the UE is configured by the base station for indirect communication (e.g., over a RIS-based communications link) according to the first transmission configuration state, but the base station instead transmits a SS/PBCH block or CSI-RS directly to the UE (e.g., over a non RIS-based communications link), the UE may be unable to accurately perform an interference measurement for indirect communication (e.g., over a RIS-based communications link) with the base station.

In some cases, the second transmission configuration state may indicate a quasi-co-location source associated with direct transmissions from the base station (e.g., over a RIS-based communications link). In an example, the quasi-co-location source may be a SS/PBCH block or a CSI-RS, which the UE may use for channel estimation, interference measurement, or interference management. In an example in which the UE is configured by the base station for direct communication (e.g., over a non RIS-based communications link) according to the second transmission configuration state, but the base station instead transmits a SS/PBCH block or CSI-RS indirectly to the UE (e.g., over an RIS-based communications link), the UE may be unable to accurately perform an interference measurement for indirect communication (e.g., over a RIS-based communications link) with the base station.

According to example aspects of the present disclosure, a UE may receive a configuration for a transmission configuration state for receiving downlink channel transmissions from a base station via a configurable surface (e.g., a RIS). The UE may receive the configuration via a transmission path including the configurable surface (e.g., a RIS-assisted communications link) or a transmission path independent of the configurable surface (e.g., a non a RIS-assisted communications link). The transmission configuration state may indicate a quasi-co-location source associated with transmission via the configurable surface. The quasi-co-location source may be a synchronization signal block associated with a broadcast channel (e.g., a SS/PBCH block) or a downlink reference signal (e.g., a CSI-RS). The UE may receive a downlink channel transmission via the configurable surface (e.g., over the RIS-assisted communications link) based on the transmission configuration state and the quasi-co-location source.

In some systems, a UE may receive downlink control information directly from a base station (e.g., over a non RIS-based communications link, independent of the RISs) according to a transmission configuration state supportive of direct communication of downlink control information from the base station. The downlink control information may include a grant for direct data transmissions (e.g., over the non RIS-based communications link) with the base station. In some other cases, a UE may receive downlink control information indirectly from the base station (e.g., over a RIS-based communications link) according to a transmission configuration state supportive of indirect communication of downlink control information from the base station.

The downlink control information may include a grant for indirect data transmissions (e.g., over the RIS-based communications link) with the base station.

FIG. 1 illustrates an example of a wireless communications system 100 that supports cross-mode scheduling with RIS-aware transmission configuration state in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communications links 125. Each base station 105 may provide a coverage area 110 over which the UEs 115 and the base station 105 may establish one or more communications links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communications links 125 over one or more carriers. The term "carrier" may refer to a set of radio frequency spectrum resources having a defined physical layer structure for supporting the communications links 125. For example, a carrier used for a communications link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communications link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARM) feedback is one technique for increasing the likelihood that data is received correctly over a communications link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to example aspects of the present disclosure, a base station 105 may determine a transmission configuration state for communicating with a UE 115. In an example, the UE 115 may receive a configuration (e.g., via a configuration message) from the base station 105 for a transmission configuration state (e.g., a TCI state) associated with receiving downlink channel transmissions (e.g., physical downlink control channel (PDCCH) transmissions, physical downlink shared channel (PDSCH) transmissions). In some examples, the configuration message may be an RRC signaling message.

In some examples, the configuration may indicate one or more transmission configuration states. For example, the configuration may indicate multiple transmission configuration states. In some aspects, one or more of the transmission configuration states may be associated with RIS-based communications. For example, one or more of the transmission configuration states may be associated with receiving downlink channel transmissions via a RIS (or via multiple RISs). In an example, the transmission configuration states associated with receiving downlink channel transmissions via the RIS (or via multiple RISs) may include downlink reference signals as quasi-co-location source associated with (e.g., dedicated) for RIS-based communications.

In some other aspects, one or more of the transmission configuration states may be independent of RIS-based communications. For example, one or more of the transmission configuration states (e.g., a second group of transmission configuration states) may be independent of the MS (or RISs). In an example, the transmission configuration states (e.g., a second group of transmission configuration states) independent of the RIS (or RISs) may include downlink reference signals as quasi-co-location sources that are independent of (e.g., not associated with) MS-based communications.

Each of the transmission configuration states may include or indicate quasi-co-location relationships between downlink reference signals and DM-RS ports. In some examples, the downlink reference signals may include CSI-RSs. In some other examples, the downlink reference signals may include SS/PBCHs. Example aspects of the reference signals and the quasi-co-location relationship types are described with reference to FIG. 3.

According to other example aspects of the present disclosure, the UE 115 may receive a configuration including a first group of transmission configuration states associated with transmission via a RIS (e.g., RIS-based communications) and a second group of transmission configuration states independent of the RIS (e.g., non RIS-based communications). The UE 115 may receive downlink control information according to a first transmission configuration state (e.g., a RIS-based configuration state) of the first group of transmission configuration states. In some aspects, the UE may receive the downlink control information via a transmission path including the configurable surface (e.g., over a MS-based communications link). The downlink control information may include a grant scheduling a data transmission according to a second transmission configuration state (e.g., a non RIS-based configuration state) of the second group of transmission configuration states.

The UE 115 may perform or receive the data transmission according to the second transmission configuration state (e.g., non RIS-based configuration state). The data transmission may be an uplink data transmission or a downlink data transmission. In some examples, the UE may perform or receive the data transmission according to the second transmission configuration state, via a transmission path independent of the configurable surface (e.g., over a non RIS-based communications link). In some aspects, the UE 115 may receive the downlink control information based on a set of resources associated with transmission via the MS being less than a threshold.

Aspects of the disclosure are initially described in the context of wireless communications systems. Examples of processes and signaling exchanges that support cross-mode scheduling with MS-aware transmission configuration state. Aspects of the disclosure are further illustrated by and described with reference to apparatus diagrams, system diagrams, and flowcharts that relate to cross-mode scheduling with RIS-aware transmission configuration state in accordance with aspects of the present disclosure.

Figure 2:
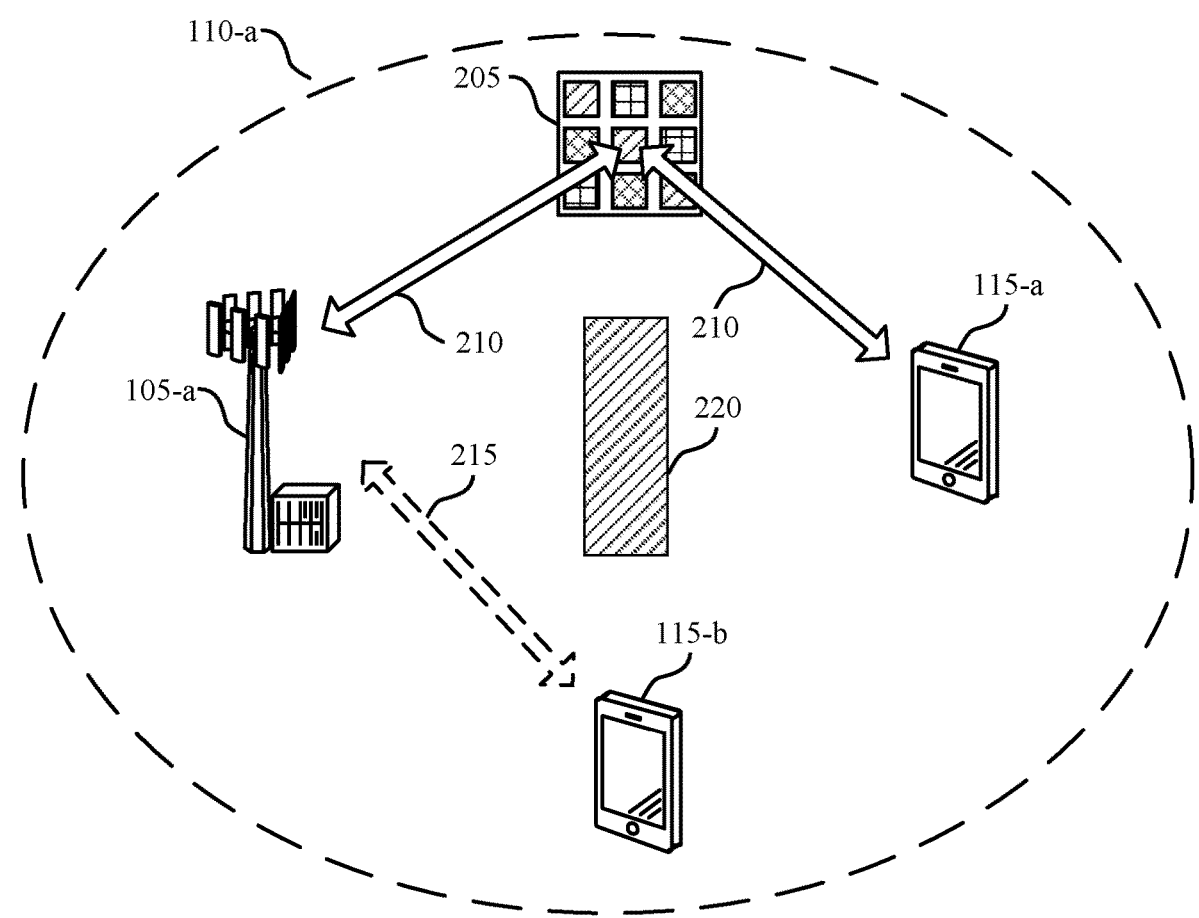
FIG. 2 illustrates an example of a wireless communications system that supports cross-mode scheduling with RIS-aware transmission configuration state in accordance with aspects of the present disclosure.

FIG. 2 illustrates an example of a wireless communications system 200 that supports cross-mode scheduling with RIS-aware transmission configuration state in accordance with aspects of the present disclosure. In some examples, wireless communications system 200 may implement aspects of wireless communication system 100. For example, the wireless communications system 200 may include a UE 115-*a*, a UE 115-*b*, and a base station 105-*a*, which may be examples of corresponding devices described herein with reference to FIG. 1.

In some aspects, the UE 115-*a* and the base station 105-*a* may communicate within a geographic coverage area 110-*a* of the base station 105-*a* via a communications link 210. For example, the base station 105-*a* may configure the UE 115-*a* according to a first TCI state supportive of indirect communication of downlink channel transmissions (e.g., PDCCH, PDSCH) and downlink reference signals (e.g., CSI-RSs) from the base station 105-*a*. The communications link 210 may be a MS-based communications link. In an example, the UE 115-*a* and the base station 105-*a* may use a MS 205 to communicate via a communications link 210. In some cases, the UE 115-*a* and the base station 105-*a* may use multiple RISs 205 to communicate via the communications link 210.

In some other aspects, the UE 115-*b* and the base station 105-*a* may communicate within the geographic coverage area 110-*a* of the base station 105-*a* via a communications link 215. For example, the base station 105-*a* may configure the UE 115-*b* according to a second TCI state supportive of direct communication of downlink channel transmissions (e.g., PDCCH, PDSCH) and downlink reference signals (e.g., CSI-RSs) from the base station 105-*a*. The communications link 215 may be a non RIS-based communications link. In an example, the UE 115-*b* and the base station 105-*a* may communicate via the communications link 215, independent of the MS 205 (or independent of any number of RISs 205).

The RIS 205 may be a near passive device that redirects incoming signals in a specific direction according to a configuration of the RIS 205. In some examples, the configuration of the MS 205 may be preconfigured, statically or semi-statically configured, or configured by a network (e.g., configured by the base station 105-*a*). For example, the base station 105-*a* may transmit a message to the MS 205 configuring one or more elements of the MS 205. The MS 205 may include any combination of reflective and refractive surfaces configured to redirect signals between the base station 105-*a* and the UE 115-*a* (e.g., rather than using active components to amplify and re-transmit the signals).

The RIS 205 may include a processing component (e.g., a processor) that may determine a configuration for the RIS 205 (e.g., based on a message from the base station 105-*a*) and may adjust one or more parameters of the RIS 205 to support the configuration. For example, the RIS 205 may use one or more passive or near passive components to redirect signals between the base station 105-*a* and the UE 115-*a* (e.g., rather than using active components to amplify and re-transmit the signals). The RIS 205 may adjust the materials, components, or combination thereof to support a specific configuration for one or more elements of the RIS 205 (e.g., based on a configuration message from the base station 105-*a*). The RIS 205 may have a wired connection or a wireless connection with the base station 105-*a* and may be located anywhere in the coverage area 110-*a* of the base station 105-*a*.

In some aspects, using the RIS 205 (or multiple RISs 205) may extend the coverage area 110-*a* of the base station 105-*a*. In some other aspects, using the RIS 205 (or multiple RISs 205) may provide for communications between the base station 105-*a* and the UE 115-*a* under conditions in which direct communications may be unreliable. For example, interference resulting from physical proximity or environmental factors (e.g., interference, blockage 220) may be avoided or mitigated by communicating via the RIS 205 (or multiple RISs 205).

According to example aspects of the present disclosure, the base station 105-*b* may perform different channel training procedures (e.g., beamforming, beam sweeping techniques) with a UE 115 (e.g., UE 115-*a*, UE 115-*b*) based on whether the UE 115 is capable of indirect communication with the base station 105-*a* (e.g., RIS-assisted) or direct communication with the base station 105-*a* (e.g., non RIS-assisted). In some cases, the wireless communications system 200 may support initial access procedures via which a UE 115 (e.g., UE 115-*a*, UE 115-*b*) and the base station 105-*a* may identify whether communications therebetween are to be RIS-based or non RIS-based.

For example, the UE 115-*a* may be capable of RIS-based communications, and the base station 105-*a* may transmit a set of synchronization signal blocks (SSBs) having a format associated with (indicative of) RIS-based communications to the UE 115-*a*. In some aspects, in establishing RIS-based communications, the base station 105-*a* may use a fixed beam (or beam direction) for communications with the RIS 205, and the RIS 205 may conduct beamforming operations supportive of directional communications with the UE 115-*a*.

In another example, the UE 115-*b* may be incapable of RIS-based communications or not configured for RIS-based communications, and the base station 105-*a* may transmit a set of SSBs having a format associated with (indicative of) non RIS-based communications to the UE 115-*b*. In establishing RIS-based communications, the base station 105-*a* may conduct beamforming operations supportive of directional communications with the UE 115-*a*.

In some cases, the UE 115-*a* may receive downlink control information directly from the base station 105-*a* (e.g., over the communications link 215, independent of the RIS 205) according to a transmission configuration state supportive of direct communication of downlink control information from the base station 105-*a*. The downlink control information may include a grant for direct data transmissions (e.g., over the communications link 215) with the base station 105-*a*. In some other cases, the UE 115-*a* may receive downlink control information indirectly from the base station 105-*a* (e.g., over communications link 210) according to a transmission configuration state supportive of indirect communication of downlink control information from the base station 105-*a*. The downlink control information may include a grant for indirect data transmissions (e.g., over communications link 210, using RIS-based communications) with the base station 105-*a*.

Figure 3:
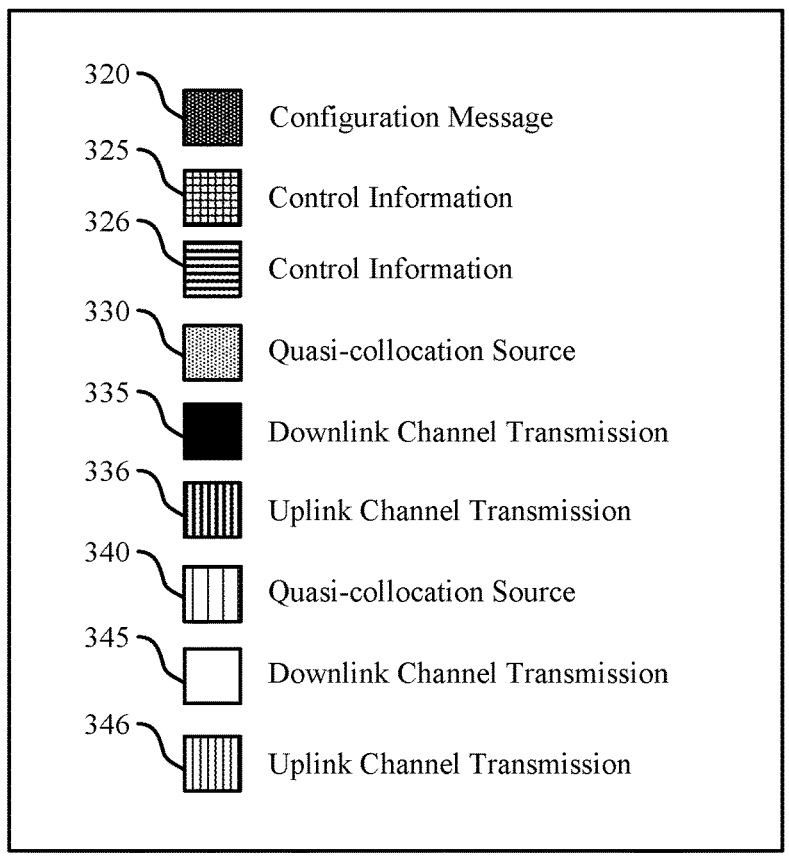
FIG. 3 illustrates an example of a wireless communications system that supports cross-mode scheduling with RIS-aware transmission configuration state in accordance with aspects of the present disclosure.
Figure 3:
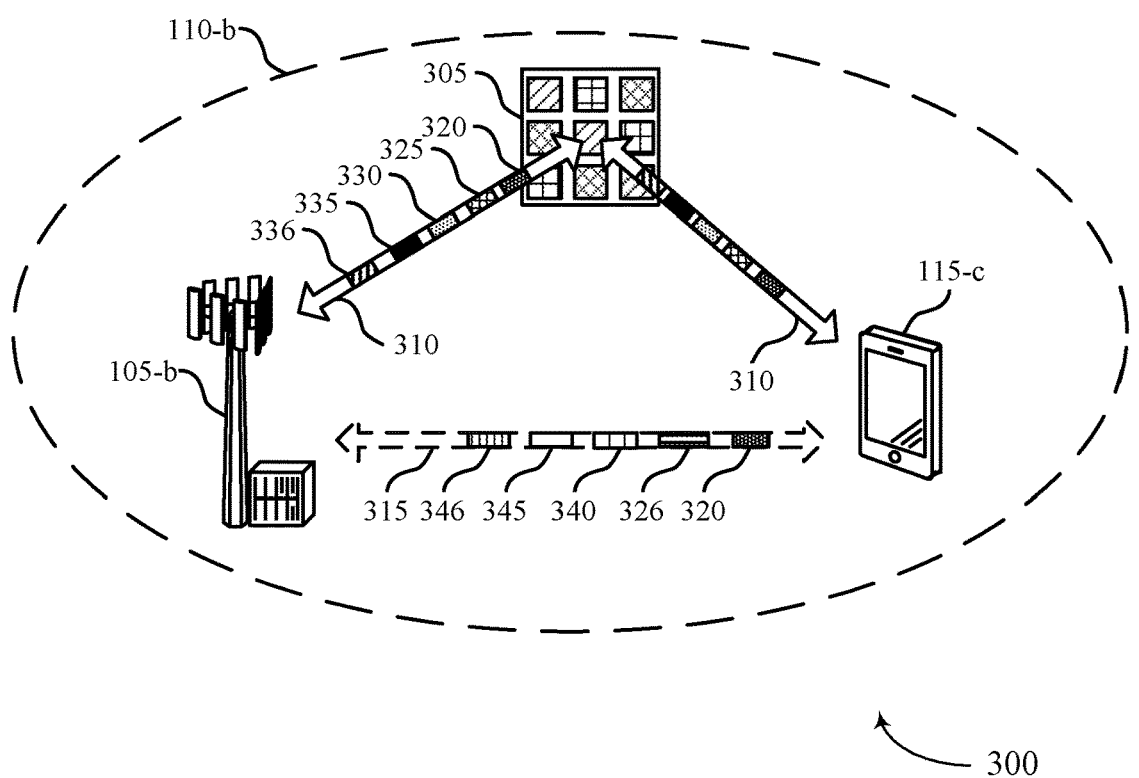

FIG. 3 illustrates an example of a wireless communications system 300 that supports cross-mode scheduling with RIS-aware transmission configuration state in accordance with aspects of the present disclosure.

The wireless communications system 300 may implement aspects of the wireless communications systems 100 and 200. For example, the wireless communications system 300 may include a UE 115-*c* and a base station 105-*b*, which may be examples of corresponding devices described herein with reference to FIGS. 1 and 2. In some aspects, the base station 105-*b* may communicate with the UE 115-*c* over a communications link 310 (e.g., via a MS 305). In some other aspects, the base station 105-*b* may communicate with the UE 115-*c* over a communications link 315 (e.g., a non RIS-based communications link, independent of the RIS 305). The UE 115-*c* and the base station 105-*b* may communicate within the geographic coverage area 110-*b* of the base station 105-*b* via the communications link 310 or the communications link 315. The communications link 310 may include (or be referred to as) a transmission path including the RIS 305 (or RISs 305). The communications link 315 may include (or be referred to as) a transmission path independent of the RIS 305 (or RISs 305).

According to example aspects of the present disclosure, the base station 105-*b* may determine a transmission configuration state for communicating with the UE 115-*c*. In an example, the UE 115-*c* may receive a configuration (e.g., via a configuration message 320) from the base station 105-*b* for a transmission configuration state (e.g., a TCI state) associated with receiving downlink channel transmissions (e.g., physical uplink control channel (PUCCH) transmissions, physical uplink shared channel (PUSCH) transmissions). In some examples, the configuration message 320 may be an RRC signaling message.

In some examples, the configuration may indicate one or more transmission configuration states. For example, the configuration may indicate multiple transmission configuration states. In some aspects, one or more of the transmission configuration states (e.g., a first group of transmission configuration states) may be associated with RIS-based communications. For example, one or more of the transmission configuration states may be associated with receiving downlink channel transmissions via the RIS 305 (or via multiple RISs 305). In an example, the transmission configuration states associated with receiving downlink channel transmissions via the RIS 305 (or via multiple RISs 305) may include downlink reference signals as quasi-co-location source associated with (e.g., dedicated) for RIS-based communications.

In some other aspects, one or more of the transmission configuration states (e.g., a second group of transmission configuration states) may be independent of RIS-based communications. For example, one or more of the transmission configuration states may be independent of the MS 305 (or RISs 305). In an example, the transmission configuration states independent of the MS 305 (or RISs 305) may include downlink reference signals as quasi-co-location sources that are independent of (e.g., not associated with) RIS-based communications.

Each of the transmission configuration states may include or indicate quasi-co-location relationships between downlink reference signals and demodulation reference signal (DM-RS) ports. In some examples, the downlink reference signals may include CSI-RSs. In some other examples, the downlink reference signals may include SS/PBCHs.

In an example case, a transmission configuration state (e.g., a transmission configuration state associated with RIS-based communications, or a transmission configuration state independent of RIS-based communications) may include parameters for configuring a quasi co-location relationship between a downlink reference signal and DM-RS ports associated with the PDSCH. In an example, for a DM-RS associated with a PDSCH, a CSI-RS resource may be configured as a quasi-co-location source for the transmission configuration state.

In another example case, a transmission configuration state may include parameters for configuring a quasi co-location relationship between a downlink reference signal and DM-RS ports associated with a PDCCH. In an example, for a DM-RS associated with a PDCCH, a CSI-RS resource may be configured as a quasi-co-location source for the transmission configuration state. In some other cases, a transmission configuration state may include parameters for configuring a quasi co-location relationship between a downlink reference signal and a CSI-RS port of a CSI-RS resource.

The transmission configuration states may indicate quasi-co-location relationships according to QCL-TypeA (e.g., for channel characteristics including Doppler shift, Doppler spread, average delay, and delay spread supportive of obtaining channel state information). In some aspects, the transmission configuration states may indicate quasi-co-location relationships according to QCL-TypeB (e.g., for channel characteristics including Doppler shift and Doppler spread supportive of obtaining channel state information).

In some other aspects, the transmission configuration states may indicate quasi-co-location relationships according to QCL-TypeC (e.g., for channel characteristics including Doppler shift and average delay supportive of measurement information such as RSRP). According to some aspects, the transmission configuration states may indicate quasi-co-location relationships according to QCL-TypeD (e.g., for channel characteristics including spatial Rx parameter supportive of beamforming).

According to example aspects of the present disclosure, the UE 115-*c* may receive, from the base station 105-*b*, control information 325 (or control information 326) indicating a transmission configuration state (e.g., a first transmission configuration state associated with RIS-based communications, a second transmission configuration state independent of RIS-based communications) for receiving downlink channel transmissions (e.g., PDCCH, PDSCH) or downlink reference signals (e.g., SS/PBCHs, CSI-RSs) from the base station 105-*b*. The UE 115-*c* may receive the control information 325 via communications link 310 (e.g., via the RIS 305) or receive the control information 326 via communications link 315. In an example, the control information 325 (or control information 326) may be included in an activation message (e.g., a downlink control information (DCI) message) transmitted by the base station 105-*b*. In some aspects, the control information 325 (or control information 326) may further indicate time and frequency resources associated with receiving a downlink channel transmission 335 or a downlink channel transmission 345.

In an example, the control information 325 (or control information 326) may include an indication that activates the first transmission configuration state. According to the first transmission state, for example, the UE 115-*c* may receive a quasi-co-location source 330 and the downlink channel transmission 335 via a transmission path including the MS 305. For example, the base station 105-*a* may transmit the quasi-co-location source 330 to the UE 115-*c* via the MS 305 using the communications link 310. In another example, the base station 105-*a* may transmit the downlink channel transmission 335 to the UE 115-*c* via the MS 305 using the communications link 310.

In another example, the control information 325 (or control information 326) may include an indication that activates the second transmission configuration state. According to the second transmission state, for example, the UE 115-*c* may receive a quasi-co-location source 340 and the downlink channel transmission 345 via a transmission path independent of (e.g., excluding) the MS 305. For example, the base station 105-*a* may transmit the quasi-co-location source 340 to the UE 115-*c* using the communications link 315. In another example, the base station 105-*a* may transmit the downlink channel transmission 345 to the UE 115-*c* using the communications link 315.

In some aspects, the UE 115-*c* may transmit an activation request to the base station 105-*b* indicating a transmission configuration state. For example, the activation request may indicate the first transmission configuration state (e.g., for RIS-based communications) or the second transmission configuration state (e.g., for non RIS-based communications). In some aspects, the UE 115-*c* may transmit the activation request via an uplink control information (UCI) message, a MAC control element (CE), or an RRC message. In an example, the base station 105-*b* may transmit (and the UE 115-*c* may receive) the control information 325 (or control information 326) based on the activation request.

According to example aspects of the present disclosure, the configuration received by the UE 115-*c* (e.g., via the configuration message 320) from the base station 105-*b* may indicate the first transmission configuration state, where the first transmission configuration state is associated with receiving the downlink channel transmission 335 via the RIS 305 (or via multiple RISs 305). In some aspects, the first transmission configuration state may indicate the quasi-co-location source 330, where the quasi-co-location source 330 is associated with transmission via the RIS 305.

The UE 115-*c* may determine (e.g., identify) that the quasi-co-location source 330 is configured to be transmitted via the transmission path including the RIS 305 (e.g., using the communications link 310). For example, based on a format of the quasi-co-location source 330, the UE 115-*c* may identify that the quasi-co-location source 330 is configured to be transmitted via the transmission path including the RIS 305 (e.g., using the communications link 310).

The quasi-co-location source 330 may include a SS/PBCH block (e.g., SSB inclusive of one or more synchronization signals and a PBCH channel). In some aspects, for a UE 115 incapable of RIS-based communications, such a UE 115 may be unable to decode the quasi-co-location source 330 (e.g., SS/PBCH block). In another example, the quasi-co-location source 330 may be a downlink reference signal. For example, the quasi-co-location source 330 may be a CSI-RS. In some aspects, the quasi-co-location source 330 (e.g., CSI-RS) may include or indicate CSI-RS resources allocated for transmissions via the RIS 305.

In an example in which the quasi co-location source 330 includes an SS/PBCH block, the base station 105-*b* may transmit SSBs having a format associated with (indicative of) RIS-based communications to the UE 115-*c*. For example, the base station 105-*b* may periodically transmit SS bursts including type 1 SSBs. Type 1 SSBs are SSBs configured for RIS-assisted channel training procedures (e.g. RIS-assisted initial access procedures). For example, RIS-assisted procedures may include channel training procedures to establish a communication channel (e.g., communications link 310) between the base station 105-*b* and the UE 115-*c* using the RIS 305 to create the propagation path between the base station 105-*b* and the UE 115-*c*. The type 1 SSB may include a primary synchronization signal (PSS), a secondary synchronization signal (SSS) and a PBCH. In some aspects, the type 1 SSB may be distinguishable from the type 0 SSB by transmitting the type 1 SSB over a separate synchronization frequency associated with the type 1 SSB. In some aspects, the type 1 SSB may be distinguishable from the type 0 SSB by an indication included in the type 1 SSB, such as an indication in the SSS of the type 1 SSB or indication in the PBCH of the type 1 SSB.

In some aspects, the base station 105-*b* may transmit multiple type 1 SSBs of the SS burst using different transmit beams. For example, the base station 105-*b* may transmit each transmit beam using a corresponding spatial filter to transmit a corresponding type 1 SSB in a distinct direction of the spatial coverage area (e.g., a portion of geographic coverage area 110-*b*) of the base station 105-*b*. In this case, the synchronization burst of type 1 SSBs may result in providing service coverage to at least a portion of the spatial coverage area of the base station 105-*b*.

Additionally, or alternatively, the base station 105-*b* may transmit multiple type 1 SSBs of the SS burst using the same transmit beam. For example, the base station 105-*b* may transmit multiple type 1 SSBs using a transmit beam transmitted in a direction associated with the RIS 305. In this case, the base station 105-*b* may control propagation characteristics of the RIS 305 to ensure that the type 1 SSBs are reflected from the RIS 305 on distinct beams corresponding to distinct directions of a spatial coverage area of the RIS 305. For example, the base station 105-*b* may transmit a first type 1 SSB on a transmit beam directed towards the RIS 305.

The base station 105-*b* may control a configuration of the RIS 305 such that the first type 1 SSB is reflected from the RIS 305 on a first beam (e.g., a beam 0) in a first direction. The base station 105-*b* may further transmit a second type 1 SSB in on the transmit beam directed towards the MS 305. The base station 105-*b* may control the configuration of the MS 305 such that the second type 1 SSB is reflected from the RIS 305 on a second beam (e.g., a beam 1) in a second direction. The base station 105-*b* may further transmit a third type 1 SSB in on the transmit beam directed towards the RIS 305. The base station 105-*b* may control the configuration of the RIS 305 such that the third type 1 SSB is reflected from the RIS 305 on a third beam (e.g., a beam 2) in a third direction. The base station 105-*b* may further transmit a fourth type 1 SSB in on the transmit beam directed towards the RIS 305.

The base station 105-*b* may control the configuration of the RIS 305 such that the fourth type 1 SSB is reflected from the RIS 305 on a fourth beam (e.g., a beam 3) in a fourth direction. The reflection directions associated with the beams from the RIS 305 may be configured to provide service coverage to at least a portion of the spatial coverage area of the base station 105-*b* reachable by the RIS 305. For example, the reflection directions of the RIS 305 may be configured to provide service coverage for a portion of the spatial coverage area of the base station 105-*b* otherwise unreachable by the base station 105-*b* due to a blockage.

In an example, the UE 115-*c* may receive the type 1 SSB, transmitted by the base station 105-*b*, via one or more beams reflected from the RIS 305. For example, the UE 115-*c* may receive the type 1 SSB reflected on the second beam (beam 1) from the RIS 305. The UE 115-*c*, based on receiving the type 1 SSB, may initiate a RIS-assisted channel training procedure (e.g., RIS-assisted initial access procedure). In the RIS-assisted channel training procedure, the base station 105-*b* may determine a cascaded channel between the base station 105-*b* and the UE 115-*c* via the RIS 305. The cascaded channel may include the transmit beam used to transmit the type 1 SSB from the base station 105-*b* to the RIS 305, the beam from the RIS 305 on which the type 1 SSB received by the UE 115-*c* was reflected, and the receive beam of the UE 115-*c* used to receive the type 1 SSB.

In another example, the configuration received by the UE 115-*c* (e.g., via the configuration message 320) from the base station 105-*b* may indicate the second transmission configuration state (e.g., a second TCI state), where the second transmission configuration state is associated with receiving the downlink channel transmission 345 independent of the MS 305. In some aspects, the second transmission configuration state may indicate the quasi-co-location source 340, where the quasi-co-location source 340 is not associated with transmission via the RIS 305.

The UE 115-*c* may determine (e.g., identify) that the quasi-co-location source 340 is configured to be transmitted via the transmission path independent of the RIS 305 (e.g., using the communications link 315). For example, based on a format of the quasi-co-location source 340, the UE 115-c may identify that the quasi-co-location source 340 is configured to be transmitted via the transmission path independent of the RIS 305 (e.g., using the communications link 315).

The quasi-co-location source 340 may include a SS/PBCH block. In another example, the quasi-co-location source 340 may be a downlink reference signal. For example, the quasi-co-location source 340 may be a CSI-RS. In some aspects, the quasi-co-location source 340 (e.g., CSI-RS) may include or indicate CSI-RS resources allocated for transmissions independent of the RIS 305 (or RISs 305).

In an example in which the quasi co-location source 340 includes an SS/PBCH block, the base station 105-b may transmit SSBs having a format associated with (indicative of) non RIS-based communications to the UE 115-c. For example, the base station 105-b may transmit a type 0 SSB (e.g., quasi co-location source 340), and the UE 115-c may receive the type 0 SSB. The base station 105-b may periodically transmit SS bursts including type 0 SSBs for channel training procedures for non-RIS-assisted communication between the base station 105-b and the UE 115-c. In some aspects, the base station 105-b may transmit each type 0 SSB of the SS burst using a corresponding transmit beam. For example, the base station 105-b may transmit each transmit beam using a corresponding spatial filter to transmit the corresponding type 0 SSB in a distinct direction of a spatial coverage area (e.g., a portion of geographic coverage area 110-b) of the base station 105-b. In this case, the SS burst of type 0 SSBs may result in providing initial access using channel training procedures for non-RIS-assisted communication to at least a portion of the spatial coverage area of the base station 105-b.

The UE 115-c may receive the type 0 SSB on an receive beam, for example, using receive beam sweeping and transmit a PRACH communication to the base station 105-b to initiate a RACH procedure. In this case, beam correspondence may be maintained between the base station 105-b and the UE 115-c. That is, the UE 115-c may transmit the PRACH communication using a transmit beam that corresponds to the receive beam on which the UE 115-c received the SSB, and the base station 105-b may receive the PRACH communication using an receive beam that corresponds to the transmit beam used to transmit the SSB received by the first UE 120. As used herein, a transmit beam and receive beam of a device (e.g., base station or UE) correspond to each other when they correspond to the same direction or spatial filter of the device.

According to example aspects of the present disclosure, the wireless communications system 300 (e.g., the base station 105-b, the UE 115-c, and the RIS 305) may support cross-mode scheduling of data transmissions (e.g., downlink channel transmission 335, uplink channel transmission 336, downlink channel transmission 345, uplink channel transmission 336). For example, the wireless communications system 300 may support cross-mode scheduling through the communication of the control information (e.g., control information 325, control information 326). Example aspects of cross-mode scheduling are described herein.

The UE 115-c may receive the configuration message 320 (e.g., RRC signaling) from the base station 105-b. The configuration message 320 may indicate (e.g., activate) a transmission configuration state associated with RIS-based communications (e.g., over communications link 310). In some aspects, the configuration message 320 may indicate (e.g., activate) a transmission configuration state independent of RIS-based communications (e.g., over communications link 315).

In some aspects, the configuration message 320 (e.g., RRC signaling) may include a grant scheduling a data transmission (e.g., downlink channel transmission 335, uplink channel transmission 336) according to a transmission configuration state associated with RIS-based communications (e.g., over communications link 310). The downlink channel transmission 335 may be, for example, a PDSCH transmission. The uplink channel transmission 336, may be, for example, a PUSCH transmission.

The configuration message 320 (e.g., RRC signaling) may indicate time and frequency resources associated with performing or receiving the data transmission (e.g., downlink channel transmission 335, uplink channel transmission 336) over the communications link 310. In some cases, the configuration message 320 (e.g., RRC signaling) may indicate a CORESET of a bandwidth part. In some aspects, the time and frequency resources associated with performing or receiving the data transmission (e.g., downlink channel transmission 335, uplink channel transmission 336) over the communications link 310 may be included in the CORESET.

In another aspect, the configuration message 320 (e.g., RRC signaling) may include a grant scheduling a data transmission (e.g., downlink channel transmission 345, uplink channel transmission 346) according to a transmission configuration state independent of RIS-based communications (e.g., over communications link 315). The downlink channel transmission 345 may be, for example, a PDSCH transmission. The uplink channel transmission 346 may be, for example, a PUSCH transmission.

The configuration message 320 (e.g., RRC signaling) may indicate time and frequency resources associated with performing or receiving the data transmission (e.g., downlink channel transmission 345, uplink channel transmission 346) over the communications link 315. In some cases, the time and frequency resources associated with performing or receiving the data transmission (e.g., downlink channel transmission 345, uplink channel transmission 346) over the communications link 315 may be included in a CORESET of a bandwidth part.

The base station 105-b may transmit control information (e.g., control information 325, control information 326) for activating a transmission configuration state. For example, the control information (e.g., control information 325, control information 326) may activate a transmission configuration state associated with RIS-based communications (e.g., over communications link 310). In some aspects, the control information (e.g., control information 325, control information 326) may activate a transmission configuration state independent of RIS-based communications (e.g., over communications link 315). The control information (e.g., control information 325, control information 326) may be included, for example, in an activation message (e.g., a downlink control information (DCI) message).

The UE 115-c may receive, from the base station 105-b, control information according to an activated transmission configuration state. For example, the transmission configuration state may be activated by RRC signaling or a DCI message. In an example, the UE 115-c may receive control information 325 according to a transmission configuration state associated with RIS-based communications (e.g., over communications link 310). In some aspects, the UE 115-c may receive the control information 325 in a PDCCH transmission. In another example, the UE 115-c may receive control information 326 according to a transmission configuration state independent of RIS-based communications (e.g., over communications link 315). In some aspects, the UE 115-c may receive the control information 326 in a PDCCH transmission.

In some aspects, the UE 115-c may receive control information (e.g., control information 325, control information 326) according to an activated transmission configuration state (e.g., as activated by RRC signaling or a DCI message). In an example, the control information may include a grant scheduling a data transmission (e.g., downlink channel transmission 335, uplink channel transmission 336, downlink channel transmission 345, uplink channel transmission 346) according to a different transmission configuration state. For example, the UE 115-c may receive control information 325 according to a transmission configuration state associated with RIS-based communications (e.g., over communications link 310), and the control information 325 may include a grant scheduling a data transmission (e.g., downlink channel transmission 345, uplink channel transmission 346) according to a transmission configuration state independent of RIS-based communications (e.g., over communications link 315).

The downlink channel transmission 345 may be, for example, a PDSCH transmission. The uplink channel transmission 346 may be, for example, a PUSCH transmission. In some aspects, the control information 325 may indicate time and frequency resources associated with performing or receiving the data transmission (e.g., downlink channel transmission 345, uplink channel transmission 346) over the communications link 315.

In another example, the UE 115-c may receive control information 326 according to a transmission configuration state independent of RIS-based communications (e.g., over communications link 315), and the control information 326 may include a grant scheduling a data transmission (e.g., downlink channel transmission 335, uplink channel transmission 336) according to a transmission configuration state associated with RIS-based communications (e.g., over communications link 310). The downlink channel transmission 335 may be, for example, a PDSCH transmission. The uplink channel transmission 336 may be, for example, a PUSCH transmission. In some aspects, the control information 326 may indicate time and frequency resources associated with performing or receiving the data transmission (e.g., downlink channel transmission 335, uplink channel transmission 336) over communications link 310.

In some examples, the control information 325 or the control information 326 may indicate configuration information for the RIS 305 (or one or more RISs 305 associated with the communications link 310). For example, the control information 325 (or the control information 326) may include a field indicating a location (e.g., coordinates, position information) of the RIS 305, a field indicating a reflection angle of the RIS 305, a field indicating an identifier of the RIS 305, or some combination thereof. In some examples, the control information 325 (or the control information 326) may include a set of fields indicating locations (e.g., coordinates, position information), a set of fields indicating reflection angles, a set of fields indicating identifiers, or some combination thereof to support indicating configuration information for multiple RISs 305.

In some aspects, by communicating control information (e.g., control information 325, control information 326) according to a first transmission configuration state (e.g., as activated at the UE 115-c based on received RRC signaling or a DCI message), in which the control information may include a grant scheduling a data transmission according to a different transmission configuration state, the base station 105-a may divert traffic between RIS-based communications (e.g., over the communications link 310) and non RIS-based communications (e.g., over the communications link 315). The base station 105-a may divert the traffic based on, for example, criteria such as channel parameters or congestion.

In an example, the wireless communications system 300 may support using RIS-based communications (e.g., using the RIS 305) for coverage-limited channel conditions. For example, in some cases, PDCCH transmissions may support a higher maximum coupling loss (MCL) between the UE 115-c and the UE 115-b compared to PUSCH transmissions. In some aspects, the base station 105-b may transmit the control information 326 (e.g., a PDCCH transmission) according to a transmission configuration state independent of MS-based communications (e.g., over the communications link 315), which may take advantage of the higher MCL for PDCCH transmissions. The control information 326 may include a grant scheduling the uplink channel transmission 336 (e.g., a PUSCH transmission having a relatively lower MCL) according to a MS-based transmission configuration state using the MS 305 (e.g., over communications link 310). In some aspects, using cross-mode scheduling as described herein, the base station 105-b may effectively divert PUSCH transmissions having a relatively lower MCL to RIS-based communications (e.g., over the communications link 310), which may effectively balance coverage for uplink and downlink transmissions.

In another example, the base station 105-b may transmit the control information (e.g., control information 325, control information 326) based on an availability of resources (e.g., time resources, frequency resources) associated with transmission using RIS-based communications (e.g., over the communications link 310) and non RIS-based communications (e.g., over the communications link 315). In an example, the base station 105-b may determine (e.g., identify) that resources associated with RIS-based communications (e.g., over communications link 310) using the RIS 305 are unavailable. For example, the base station 105-b may determine that the resources associated with RIS-based communications have already been allocated (e.g., allocated for data transmissions or control channel transmissions). In an example, the base station 105-b may determine the resource availability based on an RRC configuration of resources.

In an example, the base station 105-b may determine that an amount of resources available for RIS-based communications using the RIS 305 (e.g., over the communications link 310) are below a threshold amount of resources. In another example, the base station 105-b may determine that an amount of resources available for RIS-based communications using a co-located sub-RIS of the RIS 305 (where the sub-RIS includes a subset of elements of the RIS 305) is below a threshold amount of resources. In an example in which the base station 105-b determines (e.g., identifies) that the amount of resources available for RIS-based communications using the RIS 305 (or sub-RIS) is below the threshold amount, the base station 105-b may transmit the control information 325 according to a RIS-based transmission configuration state using the RIS 305 (e.g., over the communications link 310). The control information 325 may include a grant scheduling a data transmission (e.g., downlink channel transmission 345, uplink channel transmission 346) according to a transmission configuration state independent of RIS-based communications (e.g., over communications link 315). In some aspects, using cross-mode scheduling as described herein, the base station 105-*b* may address any congestion conditions (e.g., unavailability of resources) associated with RIS-based communications, effectively diverting traffic from RIS-based communications (e.g., over the communications link 310) to non RIS-based communications (e.g., over the communications link 315).

Figure 4:
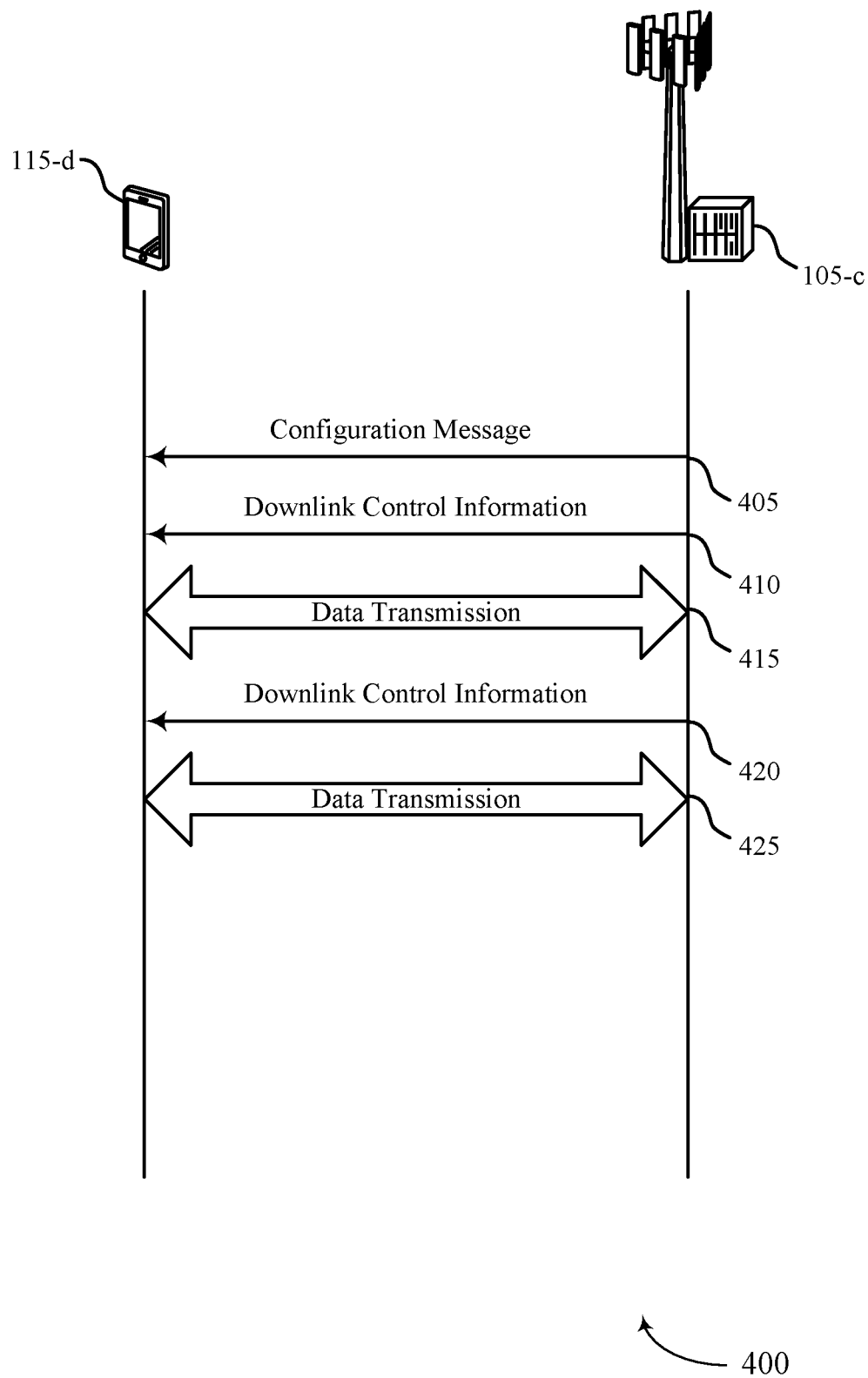
FIG. 4 illustrates an example of a process flow that supports cross-mode scheduling with RIS-aware transmission configuration state in accordance with aspects of the present disclosure.

FIG. 4 illustrates an example of a process flow 400 that supports cross-mode scheduling with RIS-aware transmission configuration state in accordance with aspects of the present disclosure. In some examples, process flow 400 may implement aspects of wireless communications systems 100, 200, or 300. Further, process flow 400 may be implemented by a UE 115-*d* and a base station 105-*c*, which may be examples of corresponding devices described herein with reference to FIGS. 1 through 3. The UE 115-*d* and the base station 105-*c* may communicate over a RIS-based communications link (e.g., via a RIS) or a non RIS-based communications link (e.g., independent of a RIS).

In the following description of the process flow 400, the operations between UE 115-*d* and base station 105-*c* may be transmitted in a different order than the order shown, or the operations performed by base station 105-*d* and UE 115-*c* may be performed in different orders or at different times. Certain operations may also be left out of the process flow 400, or other operations may be added to the process flow 400. It is to be understood that while base station 105-*c* and UE 115-*d* are shown performing a number of the operations of process flow 400, any wireless device may perform the operations shown.

At 405, the UE 115-*d* may receive a configuration (e.g., via a configuration message, for example, via RRC signaling) including a set of transmission configuration states, the set of transmission configuration states including a first group of transmission configuration states associated with transmission via one or more configurable surfaces and a second group of transmission configuration states independent of the one or more configurable surfaces.

At 410, the UE 115-*d* may receive downlink control information according to a first transmission configuration state of the first group of transmission configuration states. In some aspects, the downlink control information may include a grant scheduling a data transmission according to a second transmission configuration state of the second group of transmission configuration states. In some aspects, the downlink control information may be received based on a set of resources associated with transmission via the one or more configurable surfaces satisfies a threshold, the set of resources including set of time resources, a set of frequency resources, or both.

In some examples, receiving the downlink control information may be via a transmission path including the one or more configurable surfaces. In some aspects, the downlink control information may activate one or more transmission configuration states of the set of transmission configuration states. In some aspects, the downlink control information may include respective identifiers associated the one or more configurable surfaces. In some aspects, the data transmission may include an uplink data transmission or a downlink data transmission.

At 415, the UE 115-*d* may perform or receive the data transmission according to the second transmission configuration state. In some aspects, performing or receiving the data transmission according to the second transmission configuration state may be via a transmission path independent of the one or more configurable surfaces.

At 420, the UE 115-*d* may receive second downlink control information according to a fourth transmission configuration state of the second group of transmission configuration states. In an example, the second downlink control information may include a grant scheduling a second data transmission according to a fifth transmission configuration state of the first group of transmission configuration states.

At 425, the UE 115-*d* may perform or receive the data transmission according to the fifth transmission configuration state. In some aspects, performing or receiving the second data transmission may be via a transmission path including the one or more configurable surfaces.

Figure 5:
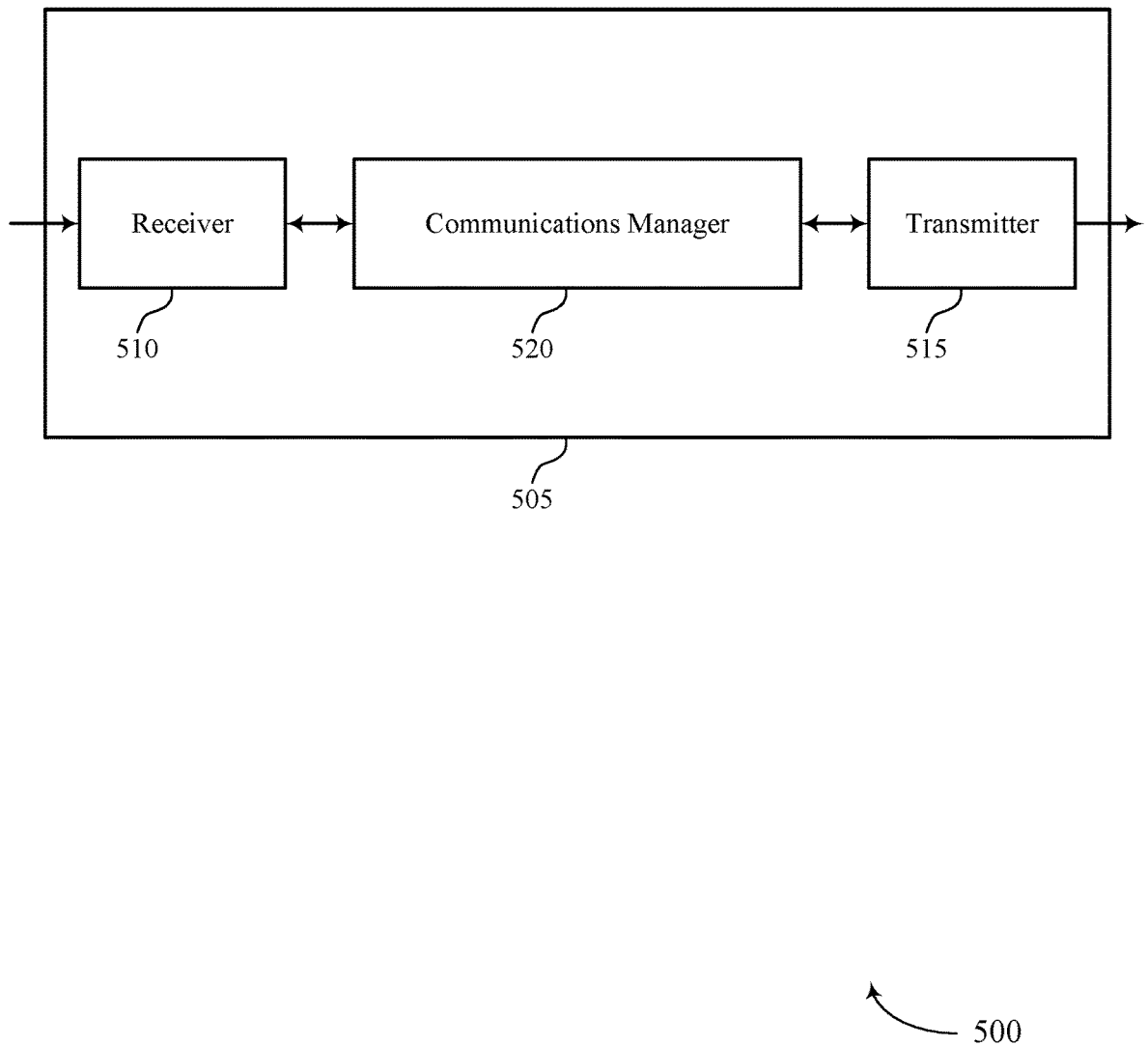
FIGS. 5 and 6 show block diagrams of devices that support cross-mode scheduling with RIS-aware transmission configuration state in accordance with aspects of the present disclosure.

FIG. 5 shows a block diagram 500 of a device 505 that supports cross-mode scheduling with RIS-aware transmission configuration state in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to cross-mode scheduling with RIS-aware transmission configuration state). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to cross-mode scheduling with RIS-aware transmission configuration state). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of cross-mode scheduling with RIS-aware transmission configuration state as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving a configuration including a set of transmission configuration states, the set of transmission configuration states including a first group of transmission configuration states associated with transmission via one or more configurable surfaces and a second group of transmission configuration states independent of the one or more configurable surfaces. The communications manager 520 may be configured as or otherwise support a means for receiving downlink control information according to a first transmission configuration state of the first group of transmission configuration states, the downlink control information including a grant scheduling a data transmission according to a second transmission configuration state of the second group of transmission configuration states. The communications manager 520 may be configured as or otherwise support a means for performing or receiving the data transmission according to the second transmission configuration state.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and a more efficient utilization of communication resources.

Figure 6:
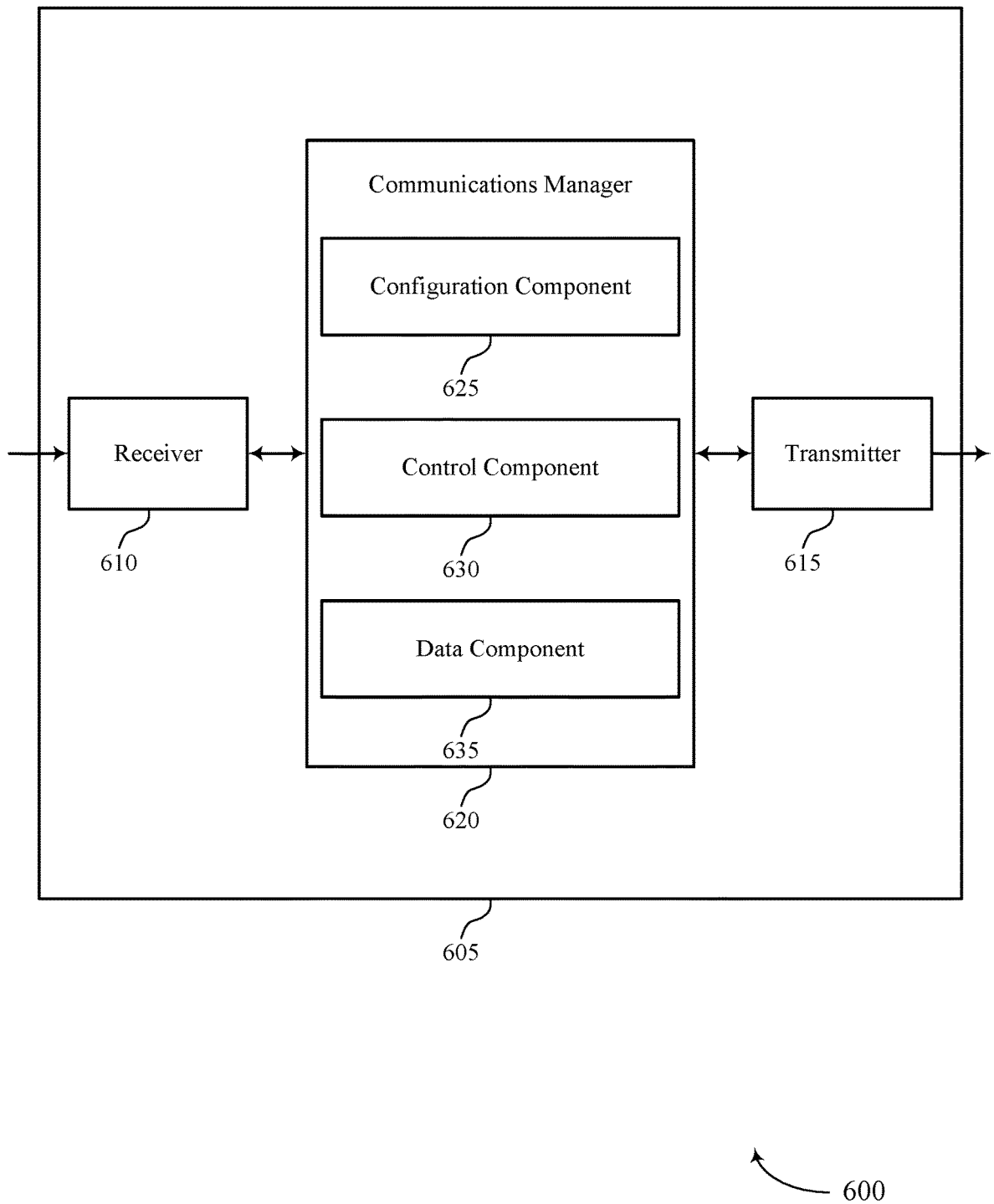

FIG. 6 shows a block diagram 600 of a device 605 that supports cross-mode scheduling with RIS-aware transmission configuration state in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to cross-mode scheduling with RIS-aware transmission configuration state). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to cross-mode scheduling with RIS-aware transmission configuration state). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of cross-mode scheduling with RIS-aware transmission configuration state as described herein. For example, the communications manager 620 may include a configuration component 625, a control component 630, a data component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The configuration component 625 may be configured as or otherwise support a means for receiving a configuration including a set of transmission configuration states, the set of transmission configuration states including a first group of transmission configuration states associated with transmission via one or more configurable surfaces and a second group of transmission configuration states independent of the one or more configurable surfaces. The control component 630 may be configured as or otherwise support a means for receiving downlink control information according to a first transmission configuration state of the first group of transmission configuration states, the downlink control information including a grant scheduling a data transmission according to a second transmission configuration state of the second group of transmission configuration states. The data component 635 may be configured as or otherwise support a means for performing or receiving the data transmission according to the second transmission configuration state.

Figure 7:
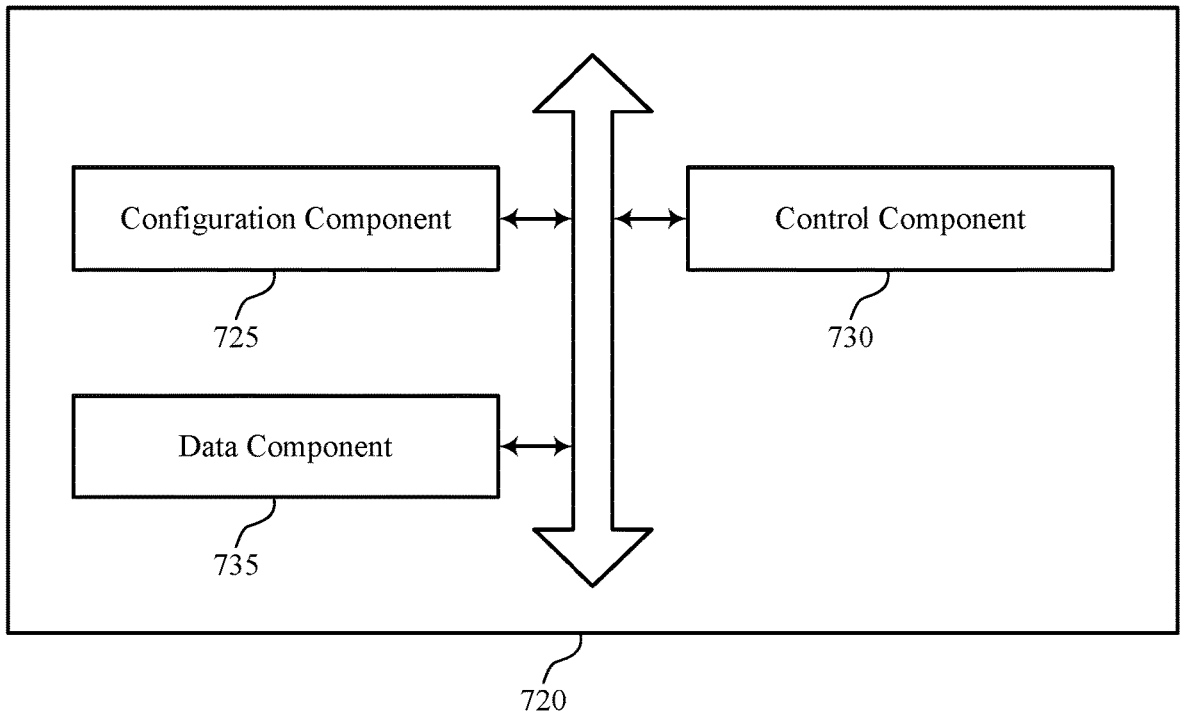
FIG. 7 shows a block diagram of a communications manager that supports cross-mode scheduling with RIS-aware transmission configuration state in accordance with aspects of the present disclosure.

FIG. 7 shows a block diagram 700 of a communications manager 720 that supports cross-mode scheduling with RIS-aware transmission configuration state in accordance with aspects of the present disclosure. The communications manager 720 may be an example of aspects of a communications manager 520, a communications manager 620, or both, as described herein. The communications manager 720, or various components thereof, may be an example of means for performing various aspects of cross-mode scheduling with RIS-aware transmission configuration state as described herein. For example, the communications manager 720 may include a configuration component 725, a control component 730, a data component 735, or any combination thereof. Each of these components may communicate, directly or indirectly, with one another (e.g., via one or more buses).

The communications manager 720 may support wireless communication at a UE in accordance with examples as disclosed herein. The configuration component 725 may be configured as or otherwise support a means for receiving a configuration including a set of transmission configuration states, the set of transmission configuration states including a first group of transmission configuration states associated with transmission via one or more configurable surfaces and a second group of transmission configuration states independent of the one or more configurable surfaces. The control component 730 may be configured as or otherwise support a means for receiving downlink control information according to a first transmission configuration state of the first group of transmission configuration states, the downlink control information including a grant scheduling a data transmission according to a second transmission configuration state of the second group of transmission configuration states. The data component 735 may be configured as or otherwise support a means for performing or receiving the data transmission according to the second transmission configuration state.

In some examples, the downlink control information is received based on a set of resources associated with transmission via the one or more configurable surfaces satisfies a threshold, the set of resources including set of time resources, a set of frequency resources, or both.

In some examples, receiving the downlink control information is via a transmission path including the one or more configurable surfaces.

In some examples, the configuration component 725 may be configured as or otherwise support a means for receiving signaling including the configuration, the signaling further including a grant scheduling a second data transmission according to a third transmission configuration state of the second group of transmission configuration states. In some examples, the data component 735 may be configured as or otherwise support a means for performing or receiving the second data transmission according to the third transmission configuration state, where performing or receiving the second data transmission is via a transmission path independent of the one or more configurable surfaces.

In some examples, the grant scheduling the second data transmission indicates a set of time resources, a set of frequency resources, or both included in a control resource set of a bandwidth part indicated by the signaling.

In some examples, the signaling includes a radio resource control configuration message.

In some examples, the control component 730 may be configured as or otherwise support a means for receiving second downlink control information according to a fourth transmission configuration state of the second group of transmission configuration states, the second downlink control information including a grant scheduling a second data transmission according to a fifth transmission configuration state of the first group of transmission configuration states. In some examples, the data component 735 may be configured as or otherwise support a means for performing or receiving the data transmission according to the fifth transmission configuration state, where performing or receiving the second data transmission is via a transmission path including the one or more configurable surfaces.

In some examples, the downlink control information activates one or more transmission configuration states of the set of transmission configuration states.

In some examples, performing or receiving the data transmission according to the second transmission configuration state is via a transmission path independent of the one or more configurable surfaces.

In some examples, the downlink control information includes respective identifiers associated the one or more configurable surfaces.

In some examples, the data transmission includes an uplink data transmission or a downlink data transmission.

Figure 8:
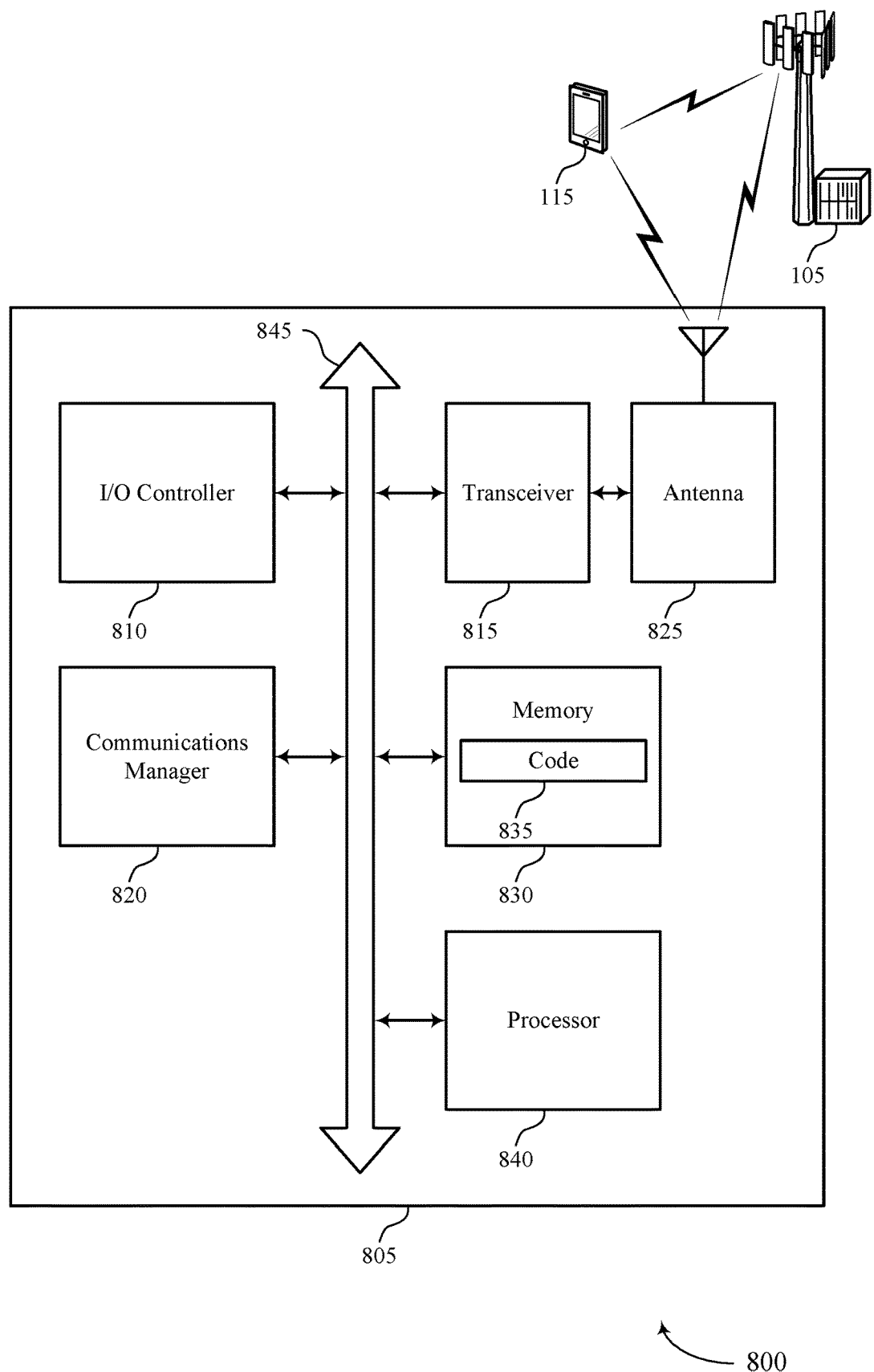
FIG. 8 shows a diagram of a system including a device that supports cross-mode scheduling with MS-aware transmission configuration state in accordance with aspects of the present disclosure.

FIG. 8 shows a diagram of a system 800 including a device 805 that supports cross-mode scheduling with RIS-aware transmission configuration state in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting cross-mode scheduling with RIS-aware transmission configuration state). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a configuration including a set of transmission configuration states, the set of transmission configuration states including a first group of transmission configuration states associated with transmission via one or more configurable surfaces and a second group of transmission configuration states independent of the one or more configurable surfaces. The communications manager 820 may be configured as or otherwise support a means for receiving downlink control information according to a first transmission configuration state of the first group of transmission configuration states, the downlink control information including a grant scheduling a data transmission according to a second transmission configuration state of the second group of transmission configuration states. The communications manager 820 may be configured as or otherwise support a means for performing or receiving the data transmission according to the second transmission configuration state.

By including or configuring the communications manager 820 in accordance with examples as described herein, the device 805 may support techniques for improved communication reliability, reduced latency, improved user experience related to reduced processing, reduced power consumption, a more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of cross-mode scheduling with RIS-aware transmission configuration state as described herein, or the processor 840 and the memory 830 may be otherwise configured to perform or support such operations.

Figure 9:
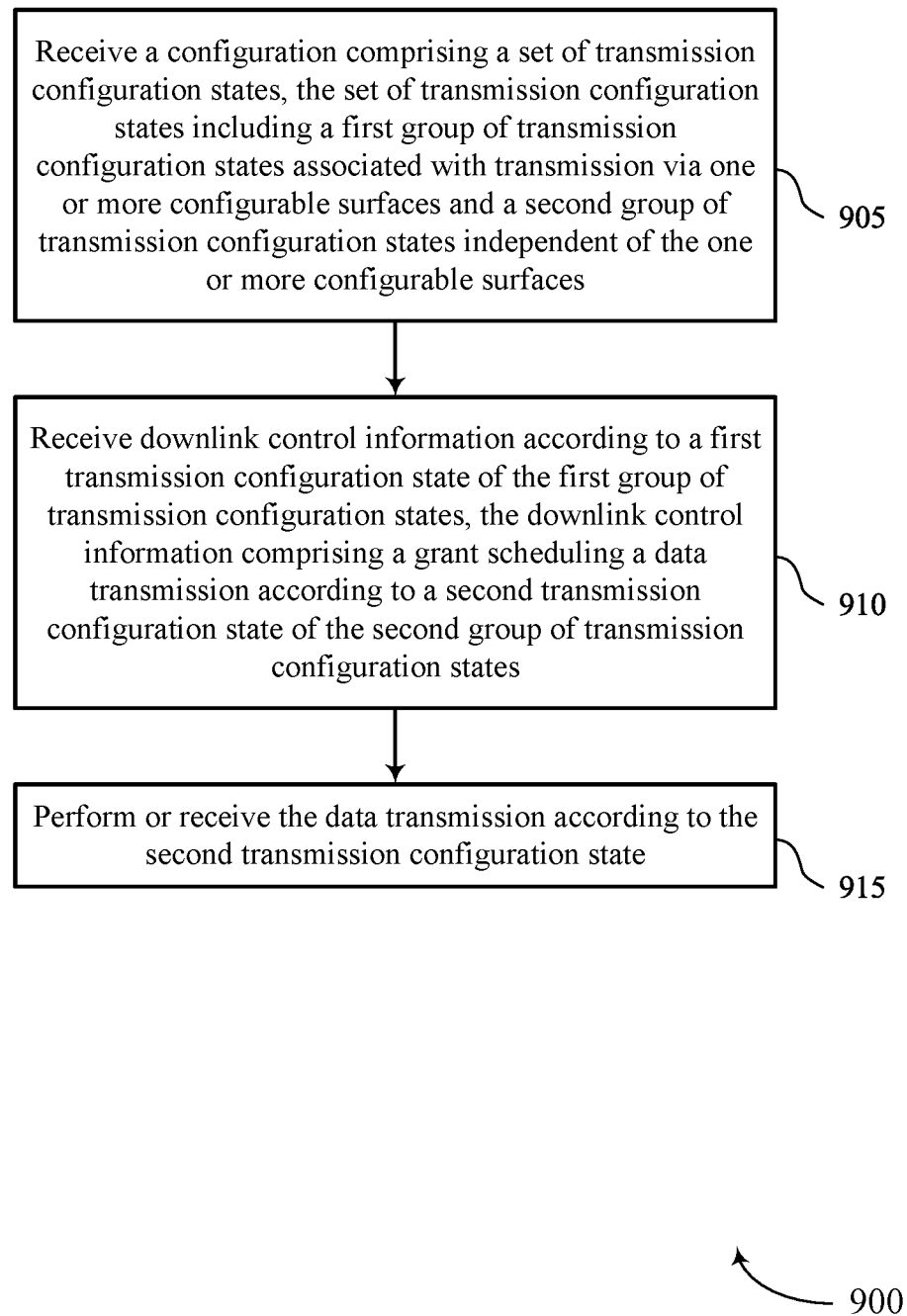
FIGS. 9 through 11 show flowcharts illustrating methods that support cross-mode scheduling with MS-aware transmission configuration state in accordance with aspects of the present disclosure.

FIG. 9 shows a flowchart illustrating a method 900 that supports cross-mode scheduling with RIS-aware transmission configuration state in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving a configuration including a set of transmission configuration states, the set of transmission configuration states including a first group of transmission configuration states associated with transmission via one or more configurable surfaces and a second group of transmission configuration states independent of the one or more configurable surfaces. The operations of 905 may be performed in accordance with examples as disclosed herein. In some examples, aspects of the operations of 905 may be performed by a configuration component 725 as described with reference to FIG. 7.

At 910, the method may include receiving downlink control information according to a first transmission configuration state of the first group of transmission configuration states, the downlink control information including a grant scheduling a data transmission according to a second transmission configuration state of the second group of transmission configuration states. The operations of 910 may be performed in accordance with examples as disclosed herein. In some examples, aspects of the operations of 910 may be performed by a control component 730 as described with reference to FIG. 7.

At 915, the method may include performing or receiving the data transmission according to the second transmission configuration state. The operations of 915 may be performed in accordance with examples as disclosed herein. In some examples, aspects of the operations of 915 may be performed by a data component 735 as described with reference to FIG. 7.

Figure 10:
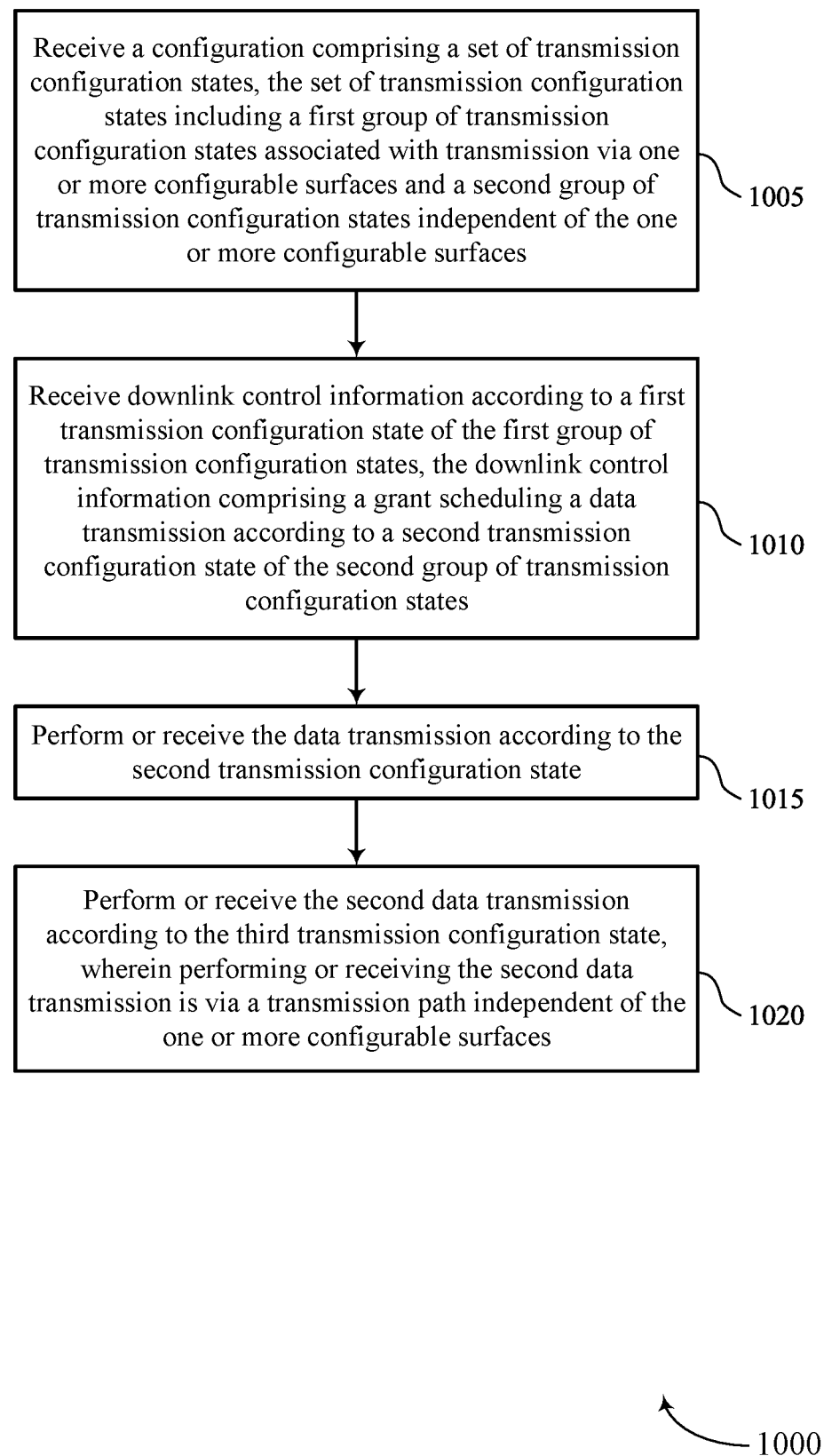

FIG. 10 shows a flowchart illustrating a method 1000 that supports cross-mode scheduling with RIS-aware transmission configuration state in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving a configuration including a set of transmission configuration states, the set of transmission configuration states including a first group of transmission configuration states associated with transmission via one or more configurable surfaces and a second group of transmission configuration states independent of the one or more configurable surfaces. In some aspects, the method may include receiving signaling including the configuration, the signaling further including a grant scheduling a second data transmission according to a third transmission configuration state of the second group of transmission configuration states. The operations of 1005 may be performed in accordance with examples as disclosed herein. In some examples, aspects of the operations of 1005 may be performed by a configuration component 725 as described with reference to FIG. 7.

At 1010, the method may include receiving downlink control information according to a first transmission configuration state of the first group of transmission configuration states, the downlink control information including a grant scheduling a data transmission according to a second transmission configuration state of the second group of transmission configuration states. The operations of 1010 may be performed in accordance with examples as disclosed herein. In some examples, aspects of the operations of 1010 may be performed by a control component 730 as described with reference to FIG. 7.

At 1015, the method may include performing or receiving the data transmission according to the second transmission configuration state. The operations of 1015 may be performed in accordance with examples as disclosed herein. In some examples, aspects of the operations of 1015 may be performed by a data component 735 as described with reference to FIG. 7.

At 1020, the method may include performing or receiving the second data transmission according to the third transmission configuration state, where performing or receiving the second data transmission is via a transmission path independent of the one or more configurable surfaces. The operations of 1020 may be performed in accordance with examples as disclosed herein. In some examples, aspects of the operations of 1020 may be performed by a data component 735 as described with reference to FIG. 7.

Figure 11:
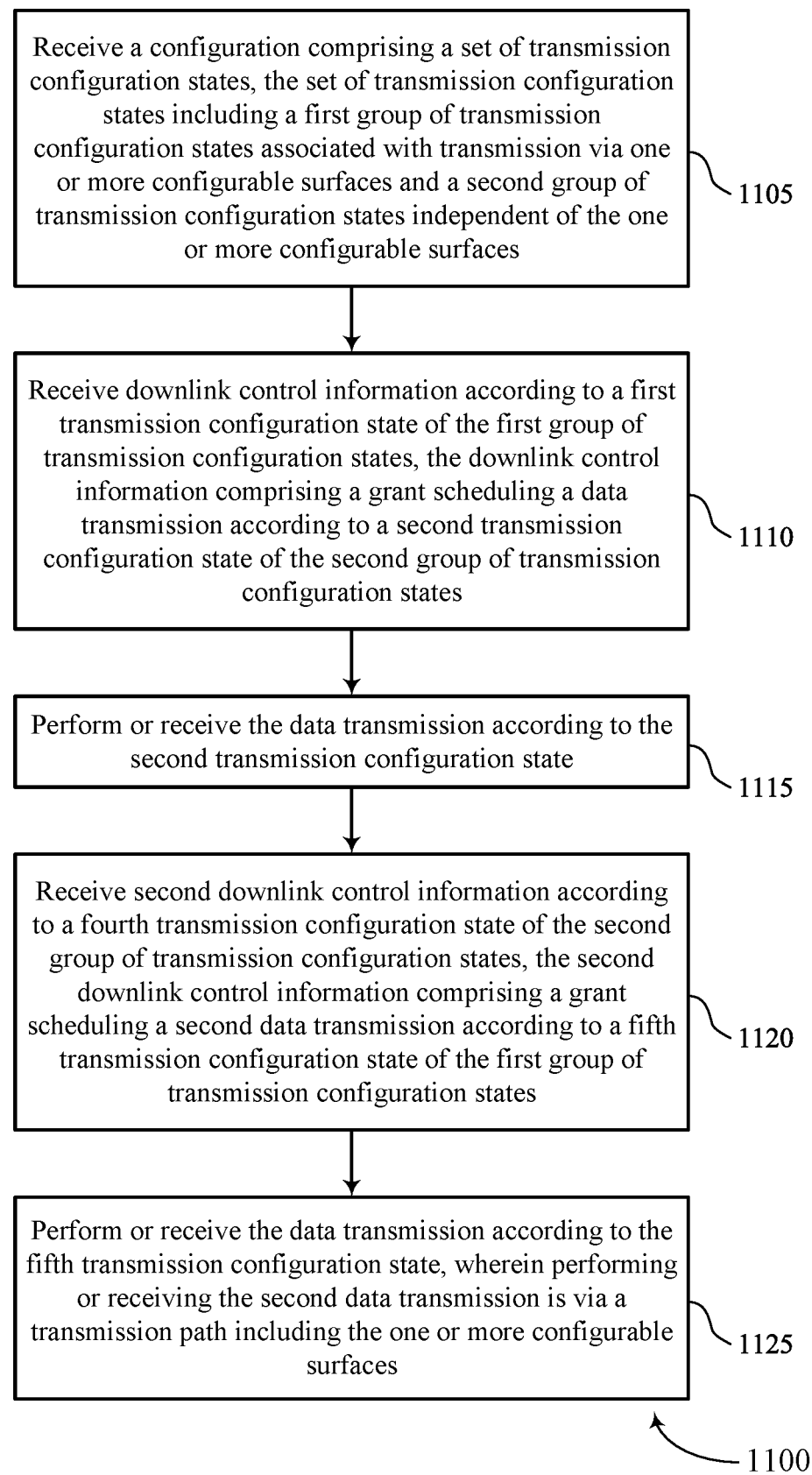

FIG. 11 shows a flowchart illustrating a method 1100 that supports cross-mode scheduling with RIS-aware transmission configuration state in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving a configuration including a set of transmission configuration states, the set of transmission configuration states including a first group of transmission configuration states associated with transmission via one or more configurable surfaces and a second group of transmission configuration states independent of the one or more configurable surfaces. The operations of 1105 may be performed in accordance with examples as disclosed herein. In some examples, aspects of the operations of 1105 may be performed by a configuration component 725 as described with reference to FIG. 7.

At 1110, the method may include receiving downlink control information according to a first transmission configuration state of the first group of transmission configuration states, the downlink control information including a grant scheduling a data transmission according to a second transmission configuration state of the second group of transmission configuration states. The operations of 1110 may be performed in accordance with examples as disclosed herein. In some examples, aspects of the operations of 1110 may be performed by a control component 730 as described with reference to FIG. 7.

At 1115, the method may include performing or receiving the data transmission according to the second transmission configuration state. The operations of 1115 may be performed in accordance with examples as disclosed herein. In some examples, aspects of the operations of 1115 may be performed by a data component 735 as described with reference to FIG. 7.

At 1120, the method may include receiving second downlink control information according to a fourth transmission configuration state of the second group of transmission configuration states, the second downlink control information including a grant scheduling a second data transmission according to a fifth transmission configuration state of the first group of transmission configuration states. The operations of 1120 may be performed in accordance with examples as disclosed herein. In some examples, aspects of the operations of 1120 may be performed by a control component 730 as described with reference to FIG. 7.

At 1125, the method may include performing or receiving the data transmission according to the fifth transmission configuration state, where performing or receiving the second data transmission is via a transmission path including the one or more configurable surfaces. The operations of 1125 may be performed in accordance with examples as disclosed herein. In some examples, aspects of the operations of 1125 may be performed by a data component 735 as described with reference to FIG. 7.

The following provides an overview of aspects of the present disclosure:

Aspect 1: A method for wireless communication at a UE, comprising: receiving a configuration comprising a set of transmission configuration states, the set of transmission configuration states including a first group of transmission configuration states associated with transmission via one or more configurable surfaces and a second group of transmission configuration states independent of the one or more configurable surfaces; receiving downlink control information according to a first transmission configuration state of the first group of transmission configuration states, the downlink control information comprising a grant scheduling a data transmission according to a second transmission configuration state of the second group of transmission configuration states; and performing or receiving the data transmission according to the second transmission configuration state.

Aspect 2: The method of aspect 1, wherein the downlink control information is received based at least in part on a set of resources associated with transmission via the one or more configurable surfaces satisfies a threshold, the set of resources comprising set of time resources, a set of frequency resources, or both.

Aspect 3: The method of any of aspects 1 through 2, wherein receiving the downlink control information is via a transmission path including the one or more configurable surfaces.

Aspect 4: The method of any of aspects 1 through 3, further comprising: receiving signaling comprising the configuration, the signaling further comprising a grant scheduling a second data transmission according to a third transmission configuration state of the second group of transmission configuration states, the method further comprising: performing or receiving the second data transmission according to the third transmission configuration state, wherein performing or receiving the second data transmission is via a transmission path independent of the one or more configurable surfaces.

Aspect 5: The method of aspect 4, wherein the grant scheduling the second data transmission indicates a set of time resources, a set of frequency resources, or both included in a control resource set of a bandwidth part indicated by the signaling.

Aspect 6: The method of any of aspects 4 through 5, wherein the signaling comprises a radio resource control configuration message.

Aspect 7: The method of any of aspects 1 through 6, further comprising: receiving second downlink control information according to a fourth transmission configuration state of the second group of transmission configuration states, the second downlink control information comprising a grant scheduling a second data transmission according to a fifth transmission configuration state of the first group of transmission configuration states; and performing or receiving the data transmission according to the fifth transmission configuration state, wherein performing or receiving the second data transmission is via a transmission path including the one or more configurable surfaces.

Aspect 8: The method of any of aspects 1 through 7, wherein the downlink control information activates one or more transmission configuration states of the set of transmission configuration states.

Aspect 9: The method of any of aspects 1 through 8, wherein performing or receiving the data transmission according to the second transmission configuration state is via a transmission path independent of the one or more configurable surfaces.

Aspect 10: The method of any of aspects 1 through 9, wherein the downlink control information comprises respective identifiers associated the one or more configurable surfaces.

Aspect 11: The method of any of aspects 1 through 10, wherein the data transmission comprises an uplink data transmission or a downlink data transmission.

Aspect 12: An apparatus for wireless communication at a UE, comprising a processor; memory coupled with the processor; and instructions stored in the memory and executable by the processor to cause the apparatus to perform a method of any of aspects 1 through 11.

Aspect 13: An apparatus for wireless communication at a UE, comprising at least one means for performing a method of any of aspects 1 through 11.

Aspect 14: A non-transitory computer-readable medium storing code for wireless communication at a UE, the code comprising instructions executable by a processor to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a configuration comprising a set of transmission configuration states, the set of transmission configuration states including a first group of transmission configuration states associated with transmission via one or more configurable surfaces and a second group of transmission configuration states independent of the one or more configurable surfaces;
   receiving downlink control information according to a first transmission configuration state of the first group of transmission configuration states, the downlink control information comprising a grant scheduling a data transmission according to a second transmission configuration state of the second group of transmission configuration states; and
   performing or receiving the data transmission according to the second transmission configuration state.

2. The method of claim 1, wherein the downlink control information is received based at least in part on a set of resources associated with transmission via the one or more configurable surfaces satisfies a threshold, the set of resources comprising set of time resources, a set of frequency resources, or both.

3. The method of claim 1, wherein receiving the downlink control information is via a transmission path including the one or more configurable surfaces.

4. The method of claim 1, further comprising:
   receiving signaling comprising the configuration, the signaling further comprising a grant scheduling a second data transmission according to a third transmission configuration state of the second group of transmission configuration states, the method further comprising:
   performing or receiving the second data transmission according to the third transmission configuration state, wherein performing or receiving the second data transmission is via a transmission path independent of the one or more configurable surfaces.

5. The method of claim 4, wherein the grant scheduling the second data transmission indicates a set of time resources, a set of frequency resources, or both included in a control resource set of a bandwidth part indicated by the signaling.

6. The method of claim 4, wherein the signaling comprises a radio resource control configuration message.

7. The method of claim 1, further comprising:
   receiving second downlink control information according to a fourth transmission configuration state of the second group of transmission configuration states, the second downlink control information comprising a grant scheduling a second data transmission according to a fifth transmission configuration state of the first group of transmission configuration states; and
   performing or receiving the data transmission according to the fifth transmission configuration state, wherein performing or receiving the second data transmission is via a transmission path including the one or more configurable surfaces.

8. The method of claim 1, wherein the downlink control information activates one or more transmission configuration states of the set of transmission configuration states.

9. The method of claim 1, wherein performing or receiving the data transmission according to the second transmission configuration state is via a transmission path independent of the one or more configurable surfaces.

10. The method of claim 1, wherein the downlink control information comprises respective identifiers associated the one or more configurable surfaces.

11. The method of claim 1, wherein the data transmission comprises an uplink data transmission or a downlink data transmission.

12. An apparatus for wireless communication at a user equipment (UE), comprising:
    a processor;
    memory coupled with the processor, and
    instructions stored in the memory and executable by the processor to cause the apparatus to:
    receive a configuration comprising a set of transmission configuration states, the set of transmission configuration states including a first group of transmission configuration states associated with transmission via one or more configurable surfaces and a second group of transmission configuration states independent of the one or more configurable surfaces;
    receive downlink control information according to a first transmission configuration state of the first group of transmission configuration states, the downlink control information comprising a grant scheduling a data transmission according to a second transmission configuration state of the second group of transmission configuration states; and perform or receive the data transmission according to the second transmission configuration state.

13. The apparatus of claim 12, wherein the downlink control information is received based at least in part on a set of resources associated with transmission via the one or more configurable surfaces satisfies a threshold, the set of resources comprising set of time resources, a set of frequency resources, or both.

14. The apparatus of claim 12, wherein receiving the downlink control information is via a transmission path including the one or more configurable surfaces.

15. The apparatus of claim 12, wherein the instructions are further executable by the processor to cause the apparatus to:
receive signaling comprising the configuration, the signaling further comprising a grant scheduling a second data transmission according to a third transmission configuration state of the second group of transmission configuration states; and
perform or receive the second data transmission according to the third transmission configuration state, wherein performing or receiving the second data transmission is via a transmission path independent of the one or more configurable surfaces.

16. The apparatus of claim 15, wherein the grant scheduling the second data transmission indicates a set of time resources, a set of frequency resources, or both included in a control resource set of a bandwidth part indicated by the signaling.

17. The apparatus of claim 15, wherein the signaling comprises a radio resource control configuration message.

18. The apparatus of claim 12, wherein the instructions are further executable by the processor to cause the apparatus to:
receive second downlink control information according to a fourth transmission configuration state of the second group of transmission configuration states, the second downlink control information comprising a grant scheduling a second data transmission according to a fifth transmission configuration state of the first group of transmission configuration states; and
perform or receive the data transmission according to the fifth transmission configuration state, wherein performing or receiving the second data transmission is via a transmission path including the one or more configurable surfaces.

19. The apparatus of claim 12, wherein the downlink control information activates one or more transmission configuration states of the set of transmission configuration states.

20. The apparatus of claim 12, wherein performing or receiving the data transmission according to the second transmission configuration state is via a transmission path independent of the one or more configurable surfaces.

21. The apparatus of claim 12, wherein the downlink control information comprises respective identifiers associated the one or more configurable surfaces.

22. The apparatus of claim 12, wherein the data transmission comprises an uplink data transmission or a downlink data transmission.

23. An apparatus for wireless communication at a user equipment (UE), comprising:
means for receiving a configuration comprising a set of transmission configuration states, the set of transmission configuration states including a first group of transmission configuration states associated with transmission via one or more configurable surfaces and a second group of transmission configuration states independent of the one or more configurable surfaces;
means for receiving downlink control information according to a first transmission configuration state of the first group of transmission configuration states, the downlink control information comprising a grant scheduling a data transmission according to a second transmission configuration state of the second group of transmission configuration states; and
means for performing or receiving the data transmission according to the second transmission configuration state.

24. The apparatus of claim 23, wherein the downlink control information is received based at least in part on a set of resources associated with transmission via the one or more configurable surfaces satisfies a threshold, the set of resources comprising set of time resources, a set of frequency resources, or both.

25. The apparatus of claim 23, wherein receiving the downlink control information is via a transmission path including the one or more configurable surfaces.

26. The apparatus of claim 23, further comprising:
means for receiving signaling comprising the configuration, the signaling further comprising a grant scheduling a second data transmission according to a third transmission configuration state of the second group of transmission configuration states; and
means for performing or receiving the second data transmission according to the third transmission configuration state, wherein performing or receiving the second data transmission is via a transmission path independent of the one or more configurable surfaces.

27. The apparatus of claim 26, wherein the grant scheduling the second data transmission indicates a set of time resources, a set of frequency resources, or both included in a control resource set of a bandwidth part indicated by the signaling.

28. The apparatus of claim 26, wherein the signaling comprises a radio resource control configuration message.

29. The apparatus of claim 23, further comprising:
means for receiving second downlink control information according to a fourth transmission configuration state of the second group of transmission configuration states, the second downlink control information comprising a grant scheduling a second data transmission according to a fifth transmission configuration state of the first group of transmission configuration states; and
means for performing or receiving the data transmission according to the fifth transmission configuration state, wherein performing or receiving the second data transmission is via a transmission path including the one or more configurable surfaces.

30. The apparatus of claim 23, wherein the downlink control information activates one or more transmission configuration states of the set of transmission configuration states.

* * * * *